US012061095B2

(12) United States Patent
Fujiyoshi

(10) Patent No.: US 12,061,095 B2
(45) Date of Patent: Aug. 13, 2024

(54) INFORMATION PROCESSING SYSTEM, PROCESSING DEVICE, AND INFORMATION PROCESSING METHOD

(71) Applicant: MICWARE CO., LTD., Hyogo (JP)

(72) Inventor: Masaya Fujiyoshi, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 46 days.

(21) Appl. No.: 18/120,535

(22) Filed: Mar. 13, 2023

(65) Prior Publication Data

US 2023/0221141 A1 Jul. 13, 2023

Related U.S. Application Data

(63) Continuation of application No. PCT/JP2021/040021, filed on Oct. 29, 2021.

(30) Foreign Application Priority Data

Oct. 30, 2020 (JP) .................................. 2020-183058
Jan. 29, 2021 (JP) .................................. 2021-014004

(51) Int. Cl.
*G01C 21/00* (2006.01)
(52) U.S. Cl.
CPC ................. *G01C 21/3859* (2020.08)
(58) Field of Classification Search
None
See application file for complete search history.

(56) References Cited

U.S. PATENT DOCUMENTS 10,296,420 B2 * 5/2019 Ishihara .................... G06F 1/24
12,003,804 B2 * 6/2024 Shin .................. H04N 21/42203
2017/0054803 A1 2/2017 Kato et al.
(Continued)

FOREIGN PATENT DOCUMENTS

JP 2017-041015 A 2/2017
JP 2018-028518 A 2/2018
(Continued)

OTHER PUBLICATIONS

Decision to Grant Patent issued in Japanese Patent Application No. 2022-559259 mailed on Apr. 2, 2024 with English Translation (7 pages).

(Continued)

*Primary Examiner* — Hunter B Lonsberry
*Assistant Examiner* — Robert Louis Pinkerton
(74) *Attorney, Agent, or Firm* — Nakanishi IP Associates, LLC

(57) ABSTRACT

A processing device and an information processing system included in a network can select a device to be connected. A processing device includes a controller and a communicator. Software includes a first implementation program to cause the controller to implement a predetermined function. First use-data is used to execute the first implementation program. The controller included in a logical network connects with, of other processing devices with each of which the controller can communicate, a processing device that implements, based on a second implementation program or second use-data, the same function as the function implemented when the first implementation program is executed.

9 Claims, 18 Drawing Sheets

(56) References Cited

U.S. PATENT DOCUMENTS

2018/0262395 A1    9/2018   Yokoyama
2023/0140745 A1*   5/2023   Da Silva ............. H04W 36/362
                                                           370/331

FOREIGN PATENT DOCUMENTS

JP    2018-147339 A    9/2018
JP    2018-201112 A    12/2018

OTHER PUBLICATIONS

International Search Report issued in PCT/JP2021/040021 mailed on Dec. 28, 2021 with English Translation (5 pages).
Written Opinion of International Searching Authority issued in PCT/JP2021/040021 mailed on Dec. 28, 2021 with English Translation (5 pages).

* cited by examiner

FIG. 7

| Device ID | User ID | Parent node | Connection server | IP address | Port | Online status | Expiry date | Updated date and time |
|---|---|---|---|---|---|---|---|---|
| A1 | A2@xxx | - | 1 | A3 | A4 | 1 | 20210201-121459 | 20210201-120000 |
| B1 | B2@xxx | - | 2 | B3 | B4 | 1 | 20210201-121459 | 20210201-120000 |
| C1 | C2@xxx | - | 3 | C3 | C4 | 1 | 20210201-121459 | 20210201-120000 |
| D1 | A2@xxx | - | 3 | D3 | D4 | 1 | 20210201-122459 | 20210201-121000 |
| E1 | A2@xxx | - | 10 | E3 | E4 | 1 | 20210201-122459 | 20210301-121000 |
| F1 | A2@xxx | E1 | 10 | E3 | E4 | 1 | 20210201-122459 | 20210301-121000 |

| Device ID | User ID | Parent node | Connection server |
|---|---|---|---|
| A1 | A2@xxx | - | 1 |
| B1 | B2@xxx | - | 2 |
| C1 | C2@xxx | - | 3 |
| D1 | A2@xxx | - | 3 |
| E1 | A2@xxx | - | 10 |
| F1 | A2@xxx | E1 | 10 |

INFORMATION PROCESSING SYSTEM, PROCESSING DEVICE, AND INFORMATION PROCESSING METHOD

BACKGROUND OF INVENTION

Field of the Invention

The present invention relates to, for example, a technique for allowing two or more processing devices included in a network to mutually use the results of processing performed by the processing devices.

Background Art

Patent Literature 1 describes an example navigation system including multiple separate devices with different navigation functions. In the navigation system, one device provides an instruction to another device, and the device that has received the instruction performs processing in accordance with its function in response to the instruction and returns the result of the processing.

As a technique for two or more devices included in a network, Patent Literature 2 describes a technique for transmitting facsimile (fax) transmission instruction information to a designated fax machine and transmitting fax transmission instruction information to an alternative device when result information Line BUSY is received.

CITATION LIST

Patent Literature

Patent Literature 1: Japanese Unexamined Patent Application Publication No. 2018-028518
Patent Literature 2: Japanese Unexamined Patent Application Publication No. 2018-201112

For example, under poorer communication conditions that occur when, for example, a vehicle is passing through a tunnel, a navigation system cannot communicate with a server. When the device receiving an instruction from the other device fails in communications in the navigation system described in Patent Literature 1, the device that has transmitted the instruction fails to receive the result of processing. To respond to such a situation, for example, an alternative device with the technique described in Patent Literature 2 may be used. However, with the technique described in Patent Literature 2, the alternative device is used after a failure of the designated device in performing processing is detected. Thus, this technique obtains only one of the results of the process performed by the designated device and the process performed by the alternative device. The results of the processes performed by the designated device and the alternative device have low reliability. In addition, the technique described in Patent Literature 2 increases a time lag until the result of the process performed by the alternative device is obtained.

SUMMARY OF INVENTION

One or more aspects of the present disclosure are directed to an information processing system that can obtain reliable results while reducing a time lag.

An information processing system according to a first aspect of the present disclosure includes two or more processing devices included in a network. Each of the two or more processing devices includes a controller and a communicator. The controller includes modules to implement a predetermined function based on software. The communicator performs communications based on control performed by the controller. The controller included in at least one of the two or more processing devices selects a first candidate and a second candidate. The first candidate is one of the modules. The second candidate implements the same function as the first candidate. The second candidate has a lower order than the first candidate based on a predetermined reference. The controller included in the at least one of the two or more processing devices transmits a command to each of the first candidate and the second candidate. The command is to implement the function. The controller included in the at least one of the two or more processing devices receives a first implementation result and a second implementation result. The first implementation result is produced by the first candidate executing the command. The second implementation result is produced by the second candidate executing the command.

The information processing system according to the first aspect can receive the first and second implementation results and thus can obtain highly reliable results. When failing to receive the first implementation result, the information processing system can promptly receive the second implementation result. Thus, the information processing system can obtain reliable results while reducing a time lag.

The information processing system according to the first aspect may have the structure described below. The controller included in at the least one of the two or more processing devices includes a function implementer. The function implementer selects the first candidate and the second candidate, transmits the command to each of the first candidate and the second candidate. The function implementer receives the first implementation result and the second implementation result. The function implementer causes an output unit to output information based on the second implementation result. The output unit outputs at least one of image data or audio data. The function implementer causes the output unit to output the information when the function implementer receives no first implementation result after a predetermined time elapses following transmission of the command to each of the first candidate and the second candidate.

When obtaining the first implementation result takes time or it fails, the information processing system with the above structure outputs the second implementation result from the output unit and thus can reduce the time taken to output an implementation result or a result of implementing a predetermined function.

In the information processing system according to the first aspect, the predetermined reference is one of a communication speed, a version of the software corresponding to the command, or a version of map data. The communication speed is a data volume transmittable and receivable per unit time between a first processing device including the function implementer and a second processing device different from the first processing device. The version of map data is used when navigation is implemented as the function.

When using the communication speed as the reference, the information processing system with the above structure selects modules with higher communication speeds as the first and second candidates and thus can reduce the time taken to transmit and receive the implementation results. Thus, the information processing system can promptly obtain the implementation results. When using the version of software corresponding to the command as the reference, for example, the information processing system selects modules based on the software with an improved function as the first and second candidates. Thus, the information processing system can obtain implementation results showing higher functions. When using the version of map data as the reference, the information processing system can obtain a navigation implementation result using a newer map.

The information processing system according to the first aspect may have the structure described below. The function implementer selects, as the first candidate or the second candidate, one of the modules included in the first processing device when the first processing device is to implement the function in accordance with the command.

The information processing system with the above structure selects the module included in the first processing device including a controller that causes the output unit to output information about the implementation result as the first or second candidate. Thus, the information processing system can avoid a failure to obtain both the first and second implementation results due to, for example, a failure in communications.

The information processing system according to the first aspect may have the structure described below. The function implementer reselects the first candidate and the second candidate based on a predetermined reference when the function implementer receives no first implementation result and no second implementation result after the predetermined time elapses.

The information processing system with the above structure reselects the first and second candidates after a predetermined time elapses to avoid a failure to obtain the implementation result for a long time.

In the information processing system according to the first aspect, the function implementer may select the first candidate and the second candidate from the modules included in at least one of the two or more processing devices being online.

The information processing system with the above structure can avoid selecting a module included in the processing device in offline as the first or second candidate.

A processing device according to an aspect of the present disclosure is included in a network together with another processing device. The processing device includes a controller and a communicator. The controller includes modules to implement a predetermined function based on software. The communicator performs communications based on control performed by the controller. The controller selects a first candidate and a second candidate. The first candidate is one of the modules. The second candidate implements the same function as the first candidate. The second candidate has a lower order than the first candidate based on a predetermined reference. The controller transmits a command to each of the first candidate and the second candidate. The command is to implement the function. The controller receives a first implementation result and a second implementation result. The first implementation result is produced by the first candidate executing the command. The second implementation result is produced by the second candidate executing the command.

The processing device can receive the first and second implementation results and thus can obtain highly reliable results. When failing to receive the first implementation result, the processing device can promptly receive the second implementation result. Thus, the processing device can obtain reliable results while reducing a time lag.

A processing method according to an aspect of the present disclosure is implementable with an information processing system. The information processing system includes two or more processing devices included in a network. Each of the two or more processing devices includes a communicator and a controller. The controller includes modules to implement a predetermined function based on software. The communicator performs communications based on control performed by the controller. The processing method includes selecting a first candidate and a second candidate. The first candidate is one of the modules. The second candidate implements the same function as the first candidate. The second candidate has a lower order than the first candidate based on a predetermined reference. The processing method includes transmitting a command to each of the first candidate and the second candidate. The command is to implement the function. The processing method includes receiving a first implementation result and a second implementation result. The above steps are performed with the controller included in at least one of the two or more processing devices.

The processing method allows reception of the first and second implementation results and thus allows highly reliable results to be obtained. When reception of the first implementation result fails, the second implementation result can be received promptly. The processing method allows reliable results to be obtained with a shorter time lag.

A processing device according to an aspect of the present disclosure includes a controller and a communicator. The controller performs control based on software. Communications of the communicator are controllable by the controller. The software includes a first implementation program. The first implementation program causes the controller to implement a predetermined function. The controller is included in a logical network. The logical network communicates a result obtained by implementing the function. The controller connects with, of other processing devices to each of which the controller is connectable through the communicator, another processing device that implements the same function as the function implemented when the first implementation program is executed. The other processing device implements the function based on the second implementation program second use-data. The second implementation program at least partially differs from the first implementation program. First use-data is used to execute the first implementation program. The second use-data at least partially differs from the first use-data.

The processing device according to the above aspect is selectively connected to the other processing device that implements, based on the second implementation program or the second use-data, the same function as the function implemented when the first implementation program is executed. Thus, the processing device is connectable to the other processing device that can produce a different result from when the first implementation program for the same function is executed. Thus, the processing device according to the first aspect can prevent the logical network from including two or more processing devices that produce the same result as the result of implementing the same function. Thus, the processing device can be included in a logical network that is less likely to include an unused processing device.

More specifically, in the processing device according to the above aspect, the software including the first implementation program and software including the second implementation program are generated or revised at positions different from each other in a time-series sequence. In addition, the first use-data and the second use-data are generated or revised at positions different from each other in a time-series sequence.

When the processing device according to the above aspect is connected to the other processing device, the controller may compare the versions of the software including the first implementation program and the software including the second implementation program with each other or the versions of the first use-data and the second use-data with each other.

The controller with the above structure can easily determine another processing device to be connected.

When the processing device according to the above aspect updates the software including the first implementation program or the first use-data, the controller may reconnect the processing device with the other processing device.

The processing device with the above structure can maintain the logical network without an unused processing device.

The technique according to the above aspects of the present invention allows reliable results to be obtained with a shorter time lag.

BRIEF DESCRIPTION OF THE DRAWINGS

FIG. 7 is a table of example location information registered with a database.

DETAILED DESCRIPTION

Embodiment

Figure 1:
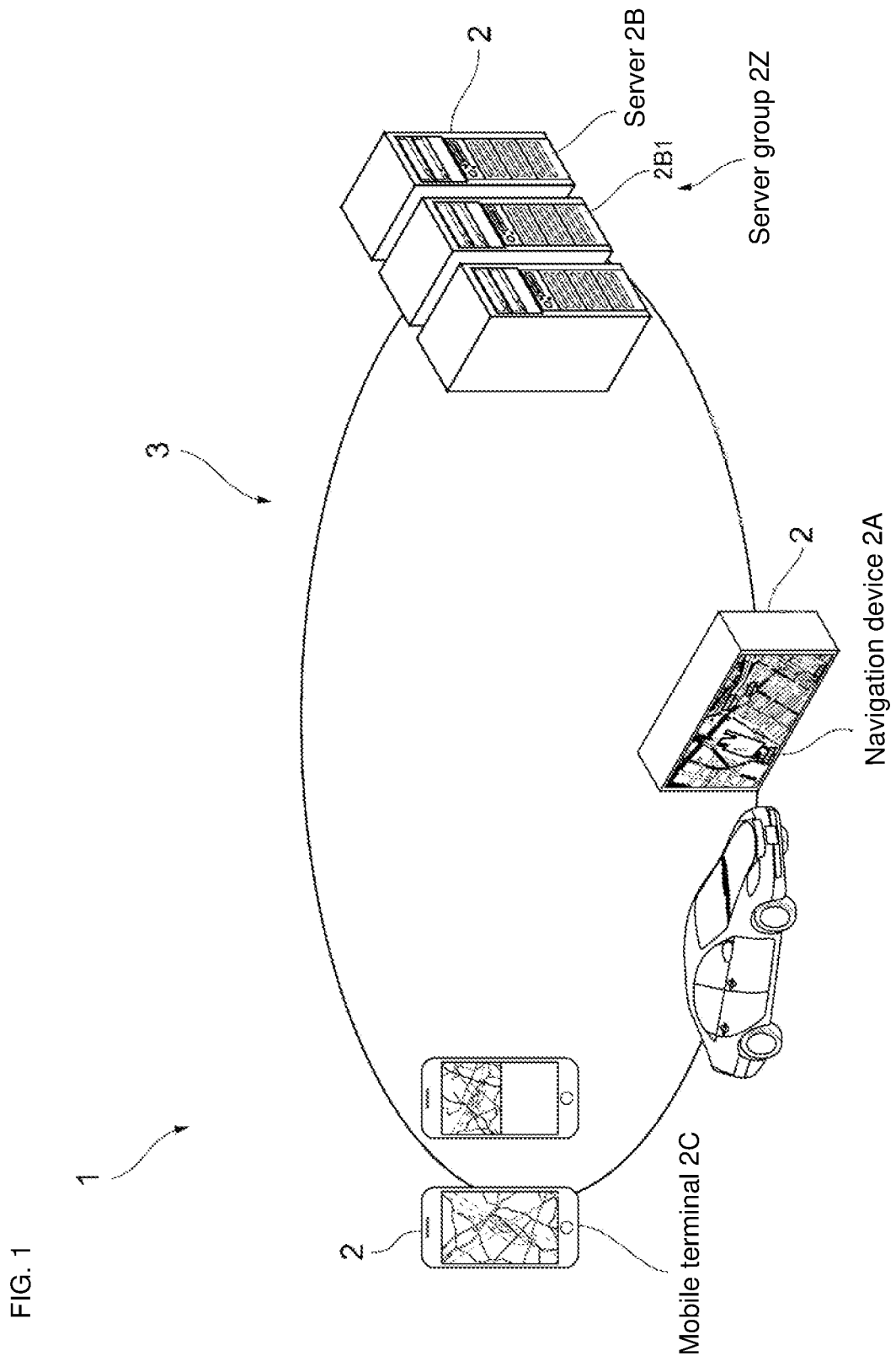
FIG. 1 is a schematic diagram of an information processing system according to an embodiment of the present invention.

An information processing system 1 according to an embodiment of the present invention shown in FIG. 1 includes two or more processing devices 2. As shown in FIG. 1, the information processing system 1 includes a logical network 3 including the two or more processing devices 2. The logical network 3 includes, of the devices connected to the logical network 3, a processing device 2 belonging to a user and processing devices 2 belonging to respective members in the same group.

In the present embodiment, each processing device 2 included in the logical network 3 includes two or more predetermined functions. The processing devices 2 have different types of and numbers of functions. Each processing device 2 may have the same function as one or more of other processing devices 2. Each processing device 2 may have functions that are not held by the other processing devices 2.

The information processing system 1 transmits, between two or more processing devices 2 having the same function, results produced by the two or more processing devices 2 implementing the function through the logical network 3. The function of linking and mutually using two or more of the processing devices 2 included in the logical network 3 and that can implement the same function is referred to as a link function. The information processing system 1 with the link function can provide intended results to a user.

The processing devices 2 in the present embodiment include processing devices 2 that indirectly access the logical network 3, in addition to the processing devices 2 that directly access the logical network 3. The processing devices 2 that directly access the logical network 3 are also referred to as parent nodes. The processing devices 2 that indirectly access the logical network 3 are also referred to as child nodes. The child nodes access the logical network 3 through the parent nodes. Examples of the child nodes include a tablet device that can neither receive a subscriber identity module (SIM) card, nor be connected using long-term evolution (LTE). The child nodes can be connected to the Internet through Wi-Fi (registered trademark) communications in, for example, a home network, but cannot be directly connected to the Internet when being away from home where Wi-Fi communications are unavailable. The processing devices 2 are also referred to as the nodes. The processing devices 2 that directly access the logical network 3 may be referred to as normal nodes to be distinguished from the child nodes.

In the present embodiment, of the two or more processing devices 2 that can implement the same function in the logical network 3, two processing devices 2 are selected as a first candidate and a second candidate based on predetermined conditions including a communication speed. The processing device 2 uses the first and second candidates simultaneously or with a short time lag. Thus, the processing device 2 can obtain, from the first candidate, the best result from the results produced by the two or more processing devices 2 included in the logical network 3 implementing the predetermined functions. Although the first candidate is unusable due to, for example, a communication failure, the processing device 2 can promptly obtain the second best result, following the result produced by the first candidate, from the second candidate implementing a predetermined function.

The two or more processing devices 2 included in the logical network 3 are connected to each other wirelessly or with a wire. The logical network 3 may allow both wireless and wired connections for connecting the processing devices 2. In the present embodiment, the processing devices 2 include a navigation device 2A, servers 2B, and a mobile terminal 2C.

Two or more servers 2B of the same type and two or more servers of the type different from the server 2B are included in a server group 2Z. Examples of the servers of the type different from the server 2B include signaling servers 2B1 shown in FIG. 6. Each signaling server 2B1 has a major role in the servers included in the server group 2Z. Each signaling server 2B1 is used to configure the logical network 3. Each signaling server 2B1 is used to determine the communication status of each processing device 2.

In the present embodiment, the navigation device 2A and the mobile terminal 2C are processing devices 2 classified into individual electronic devices. The mobile terminal 2C is, for example, a smartphone or a tablet device.

Figure 2:
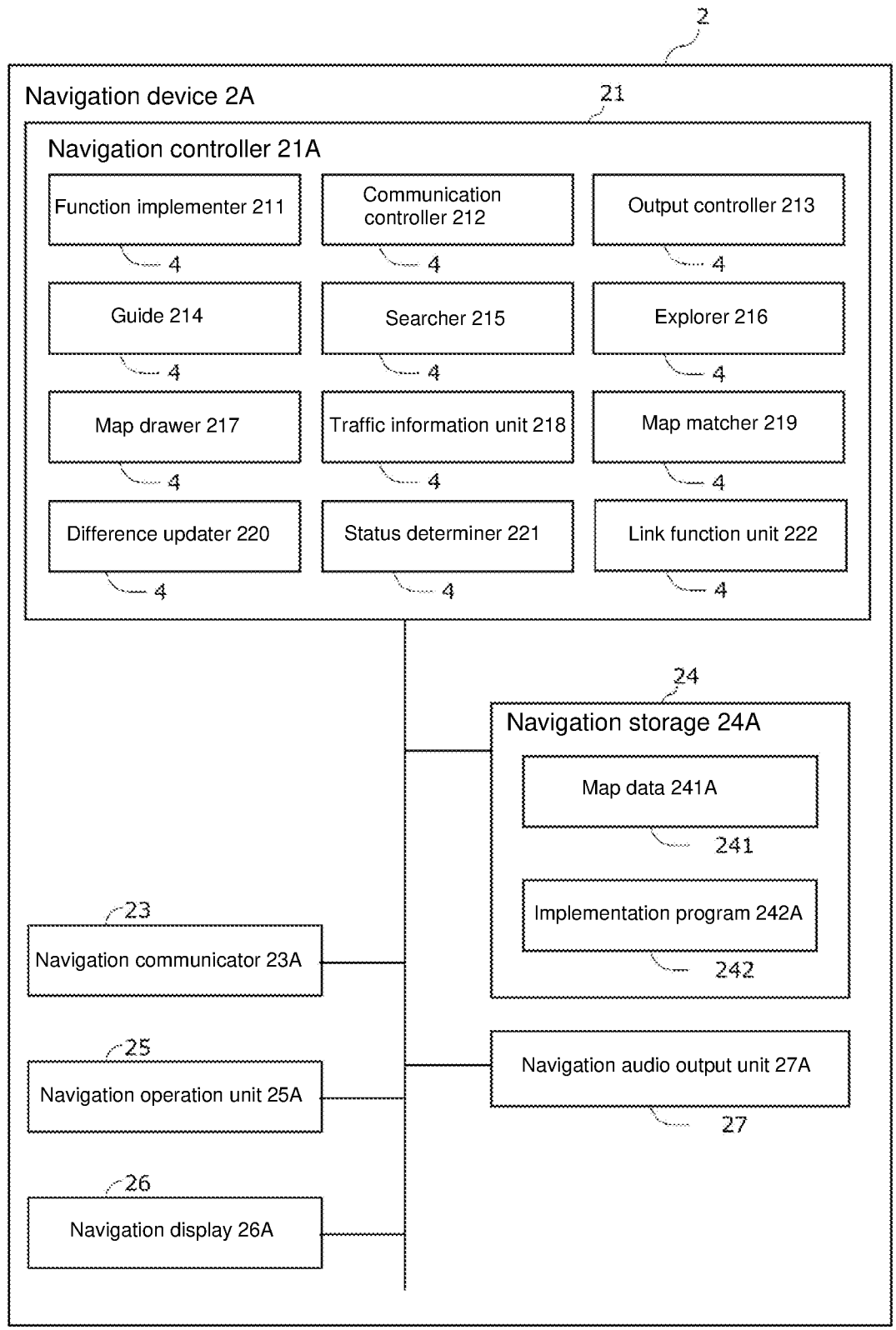
FIG. 2 is a block diagram of a navigation device serving as one of processing devices according to the embodiment.
Figure 3:
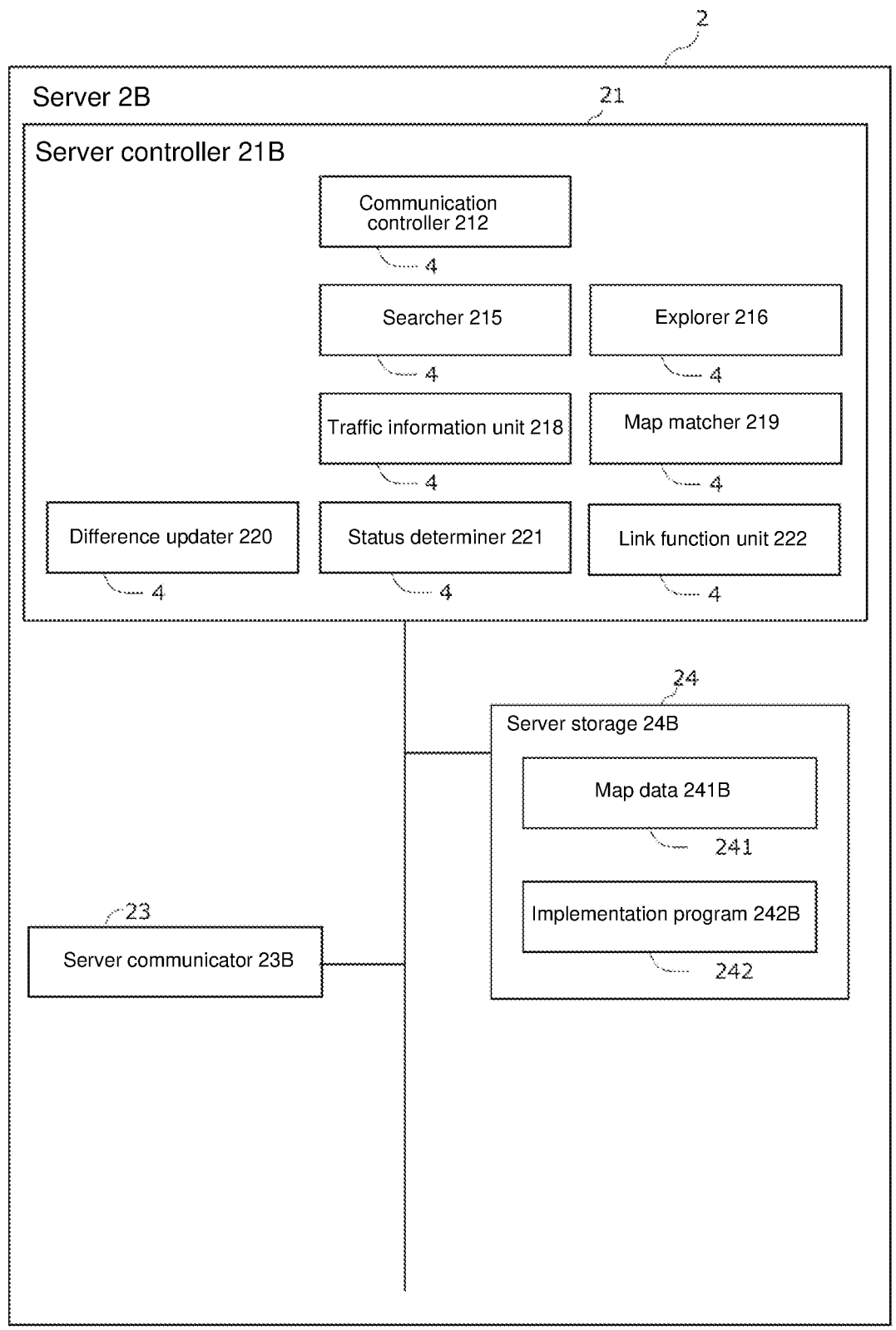
FIG. 3 is a block diagram of a server serving as one of the processing devices according to the embodiment.
Figure 4:
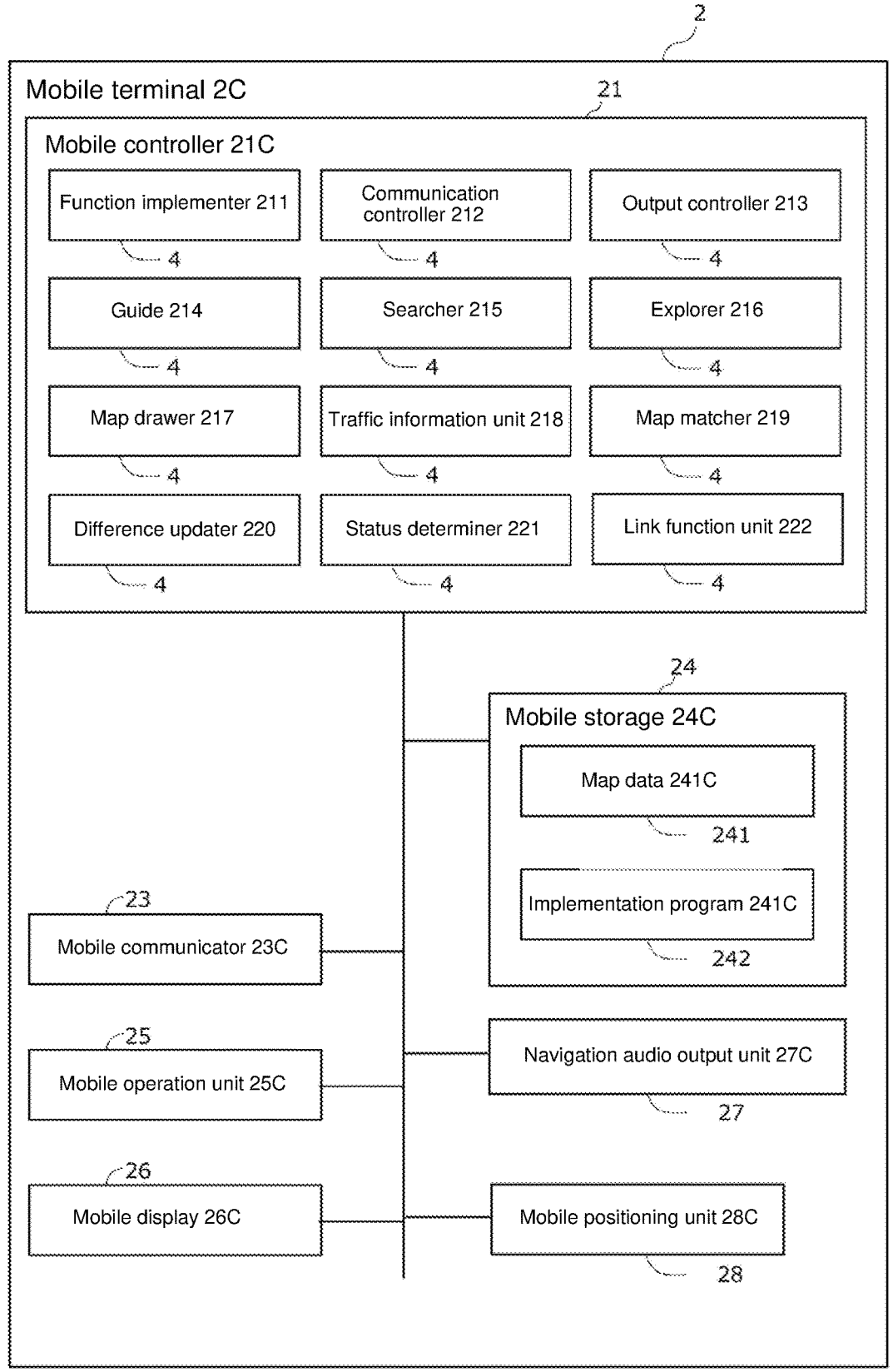
FIG. 4 is a block diagram of a mobile terminal serving as one of the processing devices according to the embodiment.

The processing devices 2 shown in FIGS. 2 to 4 each include at least one of a controller 21, a communicator 23, a storage 24, an operation unit 25, a display 26, an audio output unit 27, or a positioning unit 28. The components included in each processing device 2 are denoted with the same reference numerals without being described repeatedly.

As shown in FIG. 2, the navigation device 2A includes a navigation controller 21A serving as the controller 21, a navigation communicator 23A serving as the communicator 23, a navigation storage 24A serving as the storage 24, a navigation operation unit 25A serving as the operation unit 25, a navigation display 26A serving as the display 26, and a navigation audio output unit 27A serving as the audio output unit 27.

As shown in FIG. 3, the server 2B includes a server controller 21B serving as the controller 21, a server communicator 23B serving as the communicator 23, and a server storage 24B serving as the storage 24.

As shown in FIG. 4, the mobile terminal 2C includes a mobile controller 21C serving as the controller 21, a mobile communicator 23C serving as the communicator 23, a mobile storage 24C serving as the storage 24, a mobile operation unit 25C serving as the operation unit 25, a mobile display 26C serving as the display 26, a mobile audio output unit 27C serving as the audio output unit 27, and a mobile positioning unit 28C serving as the positioning unit 28.

The components of the navigation device 2A, the server 2B, or the mobile terminal 2C are not limited to the above. Some of the components may be eliminated, or other components may be added to the above components.

In the present embodiment, the controller 21 includes, as modules 4, at least one of a function implementer 211, a communication controller 212, an output controller 213, a guide 214, a searcher 215, an explorer 216, a map drawer 217, a traffic information unit 218, a map matcher 219, a difference updater 220, a status determiner 221, or a link function unit 222. Each module 4 is a functional unit as at least a part of, for example, a device, a machine, a system, or software. Each module 4 is a part of hardware or software to implement any one of the functions of the controller 21. The modules 4 may be referred to as engines.

The modules 4 implement predetermined functions. Examples of the predetermined functions include function implementation, communication control, output control, guiding, searching, exploring, map drawing, providing traffic information, map matching, difference updating, status determination, and a link function. A result produced by each module 4 implementing a predetermined function is herein referred to as an implementation result. A result obtained by a first candidate is also referred to as a first implementation result. A result obtained by a second candidate is also referred to as a second implementation result.

The navigation controller 21A, the server controller 21B, and the mobile controller 21C each form at least one of the modules 4. The processing device 2 including the controller 21 stores, into the storage 24, a program or software executable by the controller 21 and corresponding to the module 4. the program for implementing the function, of the programs included in software, is hereafter referred to as an implementation program 242.

The navigation device 2A stores, into the navigation storage 24A, the implementation programs 242 corresponding to the function implementer 211, the communication controller 212, the output controller 213, the guide 214, the searcher 215, the explorer 216, the map drawer 217, the traffic information unit 218, the map matcher 219, the difference updater 220, the status determiner 221, and the link function unit 222.

The server 2B stores, into the server storage 24B, the implementation programs 242 corresponding to the communication controller 212, the searcher 215, the explorer 216, the traffic information unit 218, the map matcher 219, the difference updater 220, the status determiner 221, and the link function unit 222. The mobile terminal 2C is similar to the navigation device 2A.

The controller 21 controls the communicator 23, the storage 24, the operation unit 25, the display 26, the audio output unit 27, and the positioning unit 28. The controller 21 is implemented by, for example, a control device such as a central processing unit (CPU) or a micro processing unit (MPU) executing the program stored in the storage 24.

Each module 4 can use use-data when implementing a predetermined function. Examples of the use-data include map data. The module 4 uses the map data when implementing a function such as searching, exploring, map drawing, or map matching.

The controller 21 may include two or more modules 4 that implement the same function using software pieces of different versions. The version of a software piece corresponding to each module 4 is referred to as the version for the module 4 for convenience.

Method for Configuring Logical Network 3

Figure 5:
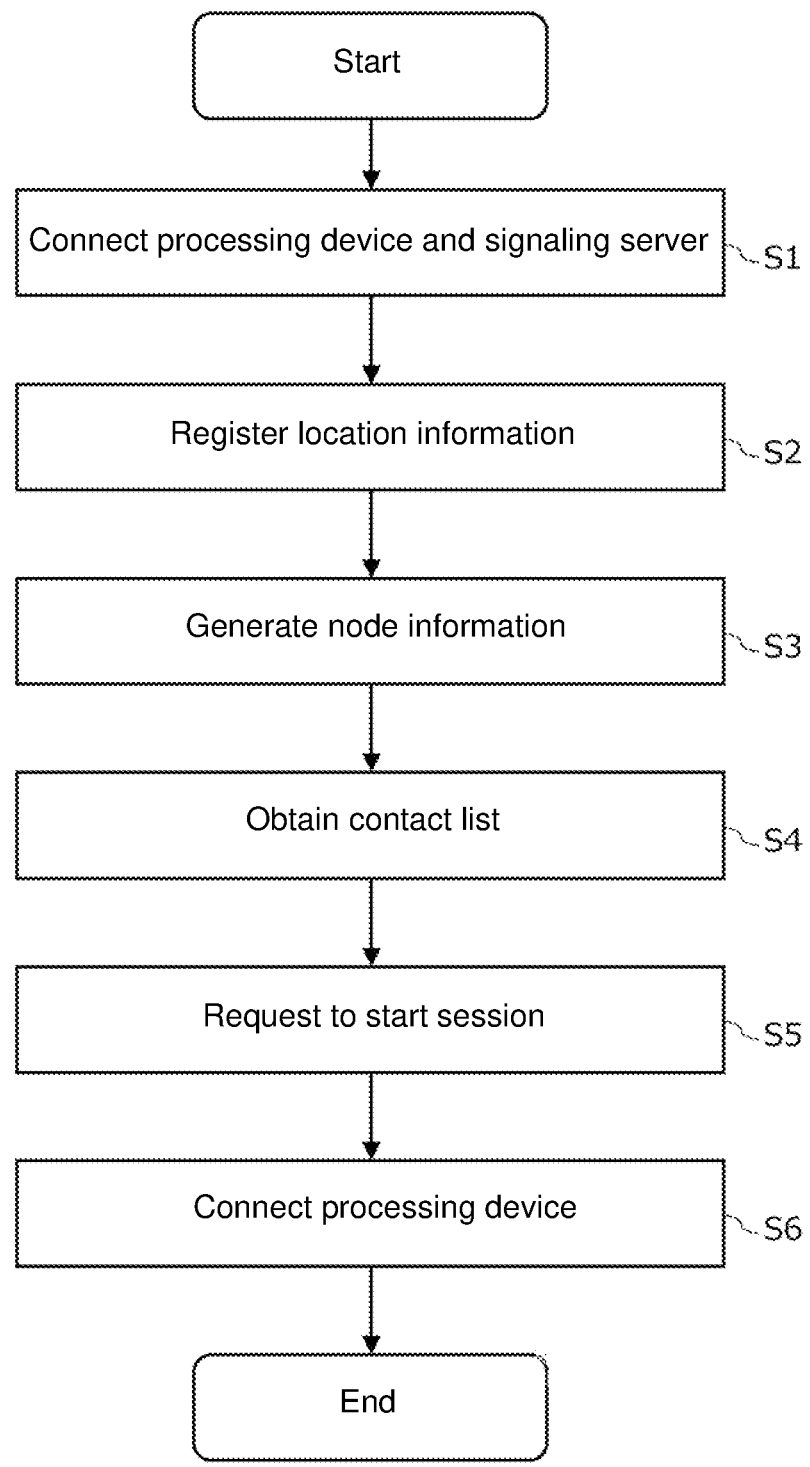
FIG. 5 is a flowchart of a procedure of configuring a logical network.

The processing devices 2 and the signaling servers 2B1 configure the logical network 3 through a configuration process shown in FIG. 5. The information processing system 1 transmits implementation results through the logical network 3 between the processing devices 2 that can implement the same function. Thus, the implementation results are not to be transmitted between the processing devices 2 that can simply produce the same result from the same function. The logical network 3 is formed by connecting, to each other, the processing devices 2 that can produce different implementation results when implementing the same function. The information processing system 1 can effectively achieve the link function using the logical network 3 with this structure.

The link function unit 222 configures the logical network 3. In the present embodiment, the link function unit 222 automatically starts configuring the logical network 3 when the processing device 2 is activated. For example, the link function unit 222 may cause the display 26 to display a button to start configuring the logical network 3 and may start configuring the logical network 3 when the button displayed on the display 26 is pressed by a user. The configuration of the logical network 3 includes addition of a new processing device 2 in the configured logical network 3.

In the example described below, the processing device 2 is newly added to the configured logical network 3. The processing devices 2 and the signaling servers 2B1 perform the same processing also when the logical network 3 is originally configured. Note that the sign "S" refers to "step" in the disclosure of the present application.

Figure 6:
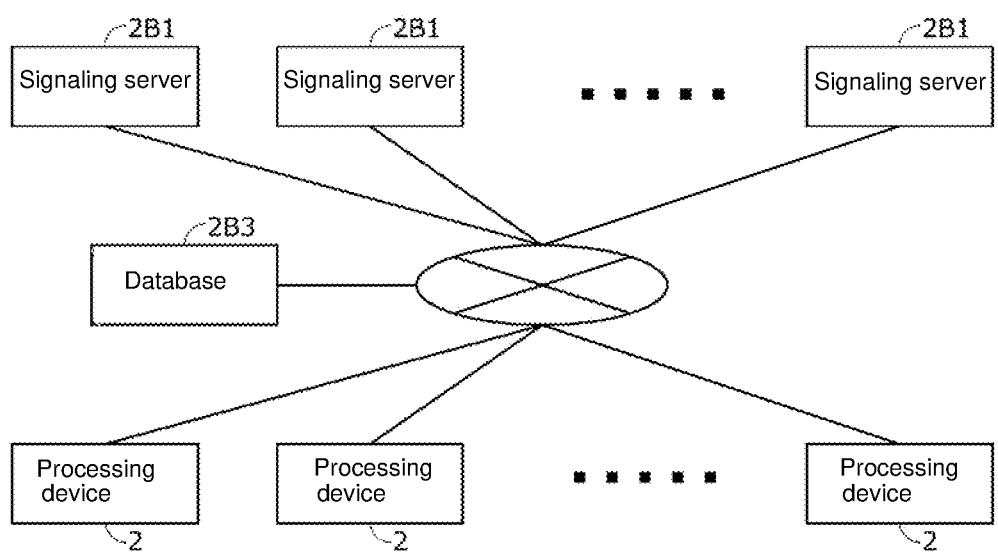
FIG. 6 is a conceptual diagram describing a method for configuring a logical network.

In S1, each link function unit 222 is connected with the communicator 23 to the two or more signaling servers 2B1 shown in FIG. 6. When multiple processing devices 2 are to configure the logical network 3, each processing device 2 is connected to either one of the signaling servers 2B1 for sharing the processing load. Each processing device 2 maintains connection with the corresponding signaling server 2B1 connected in S1 until being detached from the logical network 3. In the present embodiment, the processing device 2 is detached from the logical network 3 when turned off. The processing device 2 is detached from the logical network 3 when, for example, restarted to update software or use-data.

To be connected to a signaling servers 2B1, the link function unit 222 transmits a connection request to the signaling server 2B1 through the communicator 23. The connection request is transmitted to the signaling server 2B1 selected by a load balancer (not shown). The load balancer monitors the processing loads of the signaling servers 2B1. The signaling server 2B1 establishes connection with the processing device 2 in response to the connection request.

In S2, a database 2B3 registers location information. The location information indicates communications between the processing devices 2. When establishing the connection with the signaling server 2B1, the link function unit 222 requests the signaling server 2B1 to register the location information. The link function unit 222 requests the signaling server 2B1 to register the location information by transmitting the location information to the signaling server 2B1 through the communicator 23. The signaling server 2B1 that has received the location information registers the location information with the database 2B3. When the processing device 2 requests registration of the location information, the location information is registered with the database 2B3 through the signaling server 2B1 connected to the processing device 2.

As shown in FIG. 7, the location information indicates the device identification (ID) of the processing device 2, the user ID, the device ID of the parent node, the connection server, the IP address, the port, the online status, the expiry date of the location information, and the updated date and time of the location information.

The device ID is information identifying each processing device 2. The device ID is assigned to each processing device 2 as unique information. The user ID is information identifying the user using the processing device 2. An example of the user ID is, for example, an email address. The device ID of the parent node is information identifying the parent node. The connection server is the signaling server 2B1 to which the processing device 2 is connected. The IP address is information to identify the device connected to the Internet. The IP address is assigned to each processing device 2. The port indicates the port number used by the processing device 2 for communications. Information about the online status indicates whether the processing device 2 is online. For example, 1 indicates being online. The expiry date of the location information indicates the time limit by which the location information associated with the processing device 2 registered with the database 2B3 is effective. When the location information is expired, the database 2B3 updates the location information associated with the corresponding processing device 2. When the signaling server 2B1 and the processing device 2 are disconnected at the expiry, the database 2B3 deletes the location information without updating the information. The updated date and time indicates the date and time when the location information is registered with the database 2B3 or is updated. The location information is not limited to these items of information.

Figure 8:
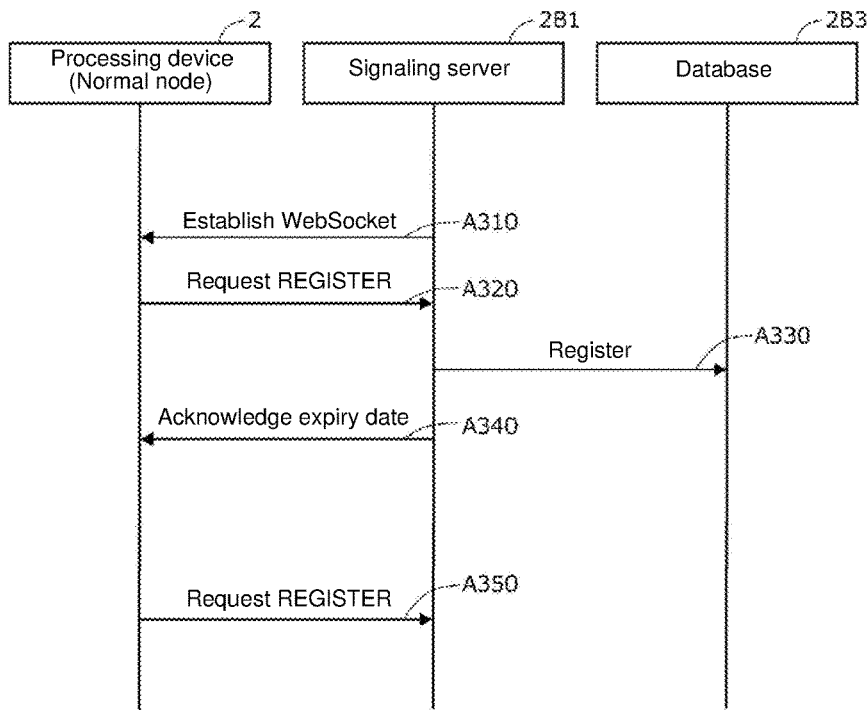
FIG. 8 is a timing chart for registering location information about a normal node with the database.

Each processing device 2 and the corresponding signaling server 2B1 perform the processing in S1 and S2 in accordance with, for example, the timing chart in FIG. 8.

In a process shown in FIG. 8, to enable communications under the telecommunications standard of WebSocket, the processing device 2 first requests the signaling server 2B1 for a WebSocket connection. As in a process A310, a WebSocket connection is thus established between the processing device 2 and the signaling server 2B1. Typically, Hypertext Transfer Protocol (HTTP) communications are used by the server to return responses to the request from a client and are not used for interactive communications between the client and the server. When HTTP communications are used, the server cannot deliver information to the client through push deliveries. In contrast, the processing device 2 and the signaling server 2B1 can perform interactive communications through WebSocket. WebSocket can establish continuous connection between the processing device 2 and the signaling server 2B1. The signaling server 2B1 can thus deliver information to the processing device 2 through push deliveries at any timing. Communications through WebSocket can be performed as interactive communications at low cost.

In a process A320, the processing device 2 then transmits a command requesting registration of the location information to the signaling server 2B1.

In a process A330, the signaling server 2B1 then stores the location information received from the processing device 2 into the database 2B3. Thus, the location information associated with the processing device 2 is registered with the database 2B3. When the location information is registered with the database 2B3, the processing device 2 can refer to the location information associated with another processing device 2 registered with the database 2B3 through the signaling server 2B1.

In a process A340, the signaling server 2B1 then transmits information about the expiry date of the location information to the processing device 2. Thus, the processing device 2 can acknowledge the expiry date of its location information registered with the database 2B3.

As indicated with a process A350, at the timing when the location information is expired, the processing device 2 retransmits the registration request of the location information to the signaling server 2B1 to update the location information.

Figure 9:
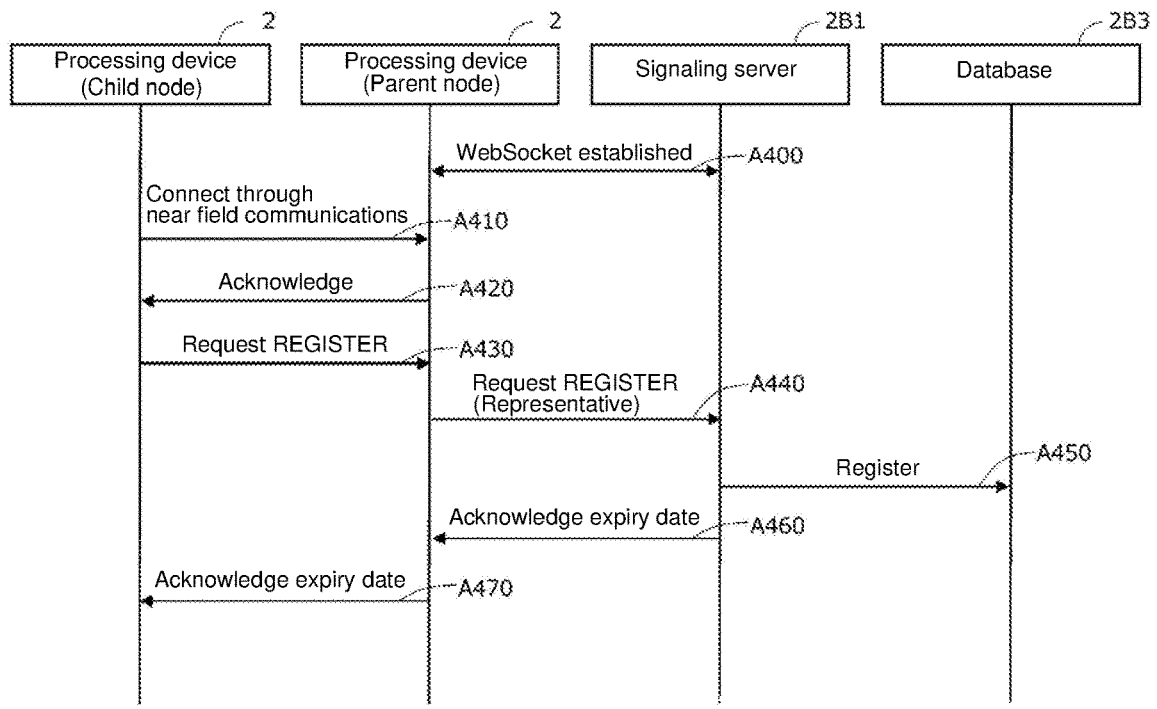
FIG. 9 is a timing chart for registering location information about a child node with the database.

When the child node is to be added to the logical network 3, the child node, the parent node, and the signaling server 2B1 perform, for example, the processing in S1 and S2 in accordance with the timing chart in FIG. 9.

To connect the child node to the signaling server 2B1, as indicated with a process A400, a WebSocket connection is to be established between the parent node and the signaling server 2B1.

For example, in a process A410, the child node requests a connection with the parent node through near field communications. The child node has no component to directly connect to, for example, the signaling server 2B1. The child node is connected to the parent node through, for example, near field communications or a universal serial bus (USB) connection. The child node is connected to the signaling server 2B1 through the parent node. Examples of the near field communications include a Bluetooth (registered trademark) connection.

In a process A420, the parent node then notifies the child node of the connection through near field communications.

In a process A430, the child node then requests the signaling server 2B1 through the parent node to register the location information with the database 2B3.

In a process A440, the parent node then requests the signaling server 2B1 to register the location information about the child node in place of the child node.

In a process A450, the signaling server 2B1 then stores location information about the received child node into the database 2B3. Thus, location information about the child node is registered with the database 2B3. The processing device 2 can thus refer to the location information about the child node registered with the database 2B3 through the signaling server 2B1.

In a process A460, the signaling server 2B1 then transmits information about the expiry date of the location information about the child node to the parent node. Subsequently, in a process A470, the parent node transmits the information about the expiry date of the location information about the child node to the child node. Thus, the child node can acknowledge the expiry date of its location information registered with the database 2B3.

With the above processes, the processing devices 2 that are to configure the logical network 3 can obtain their location information by referring to the database 2B3. The telecommunications standard and the protocol used for connection between the processing device 2 and the signaling server 2B1 may be changed as appropriate.

Figures 10, 11:
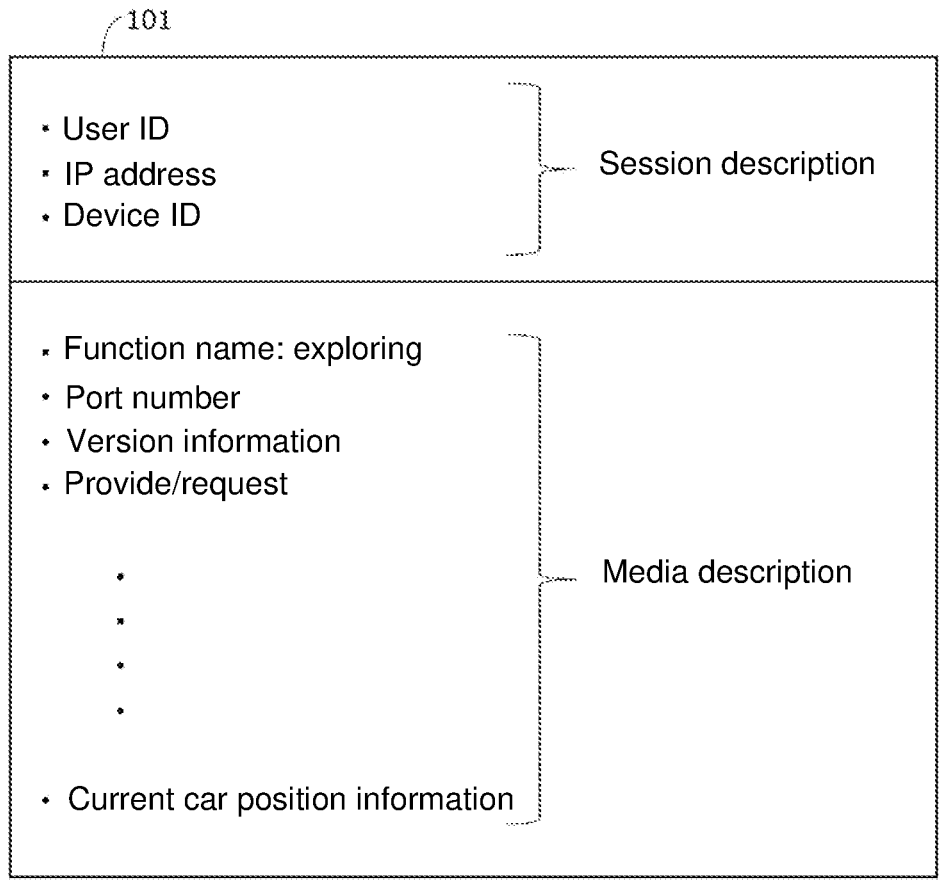
FIG. 10 is a conceptual diagram describing a structural example of node information.
FIG. 11 is a table of an example contact list transmitted from a signaling server.

In S3, the link function unit 222 generates node information. As shown in FIG. 10, the node information includes session description and media description. The session description includes the user ID, the IP address, and the device ID of the processing device 2. The media description includes, for each function implemented by the processing device 2 or intended to be implemented by another processing device 2 and for which the result is to be received, the function name, the port number, the version information, as well as whether the implementation result of the function can be provided, and whether the implementation result of the function is requested. The function name indicates a function such as searching or exploring. The version information indicates the version of the software including the implementation program 242 for implementing the function.

In S4, the link function unit 222 obtains the contact list from the connected signaling server 2B1. Based on the contact list, the link function unit 222 determines another processing device 2 to which the node information for configuring the logical network 3 is to be transmitted.

To obtain a contact list, the link function unit 222 requests a contact list from the connected signaling server 2B1 through the communicator 23. The signaling server 2B1 that has received a request for the contact list transmits the contact list shown in FIG. 11 to the processing device 2.

As shown in FIG. 11, the contact list includes information indicating the device ID of each processing device 2 that can configure the logical network 3, the user ID, the parent node, and the connection server. The contact list includes, of the location information shown in FIG. 7, information used for establishing a session. The link function unit 222 transmits, based on the location information, for example, node information to another processing device 2 having the same user ID as the processing device 2.

Figure 12:
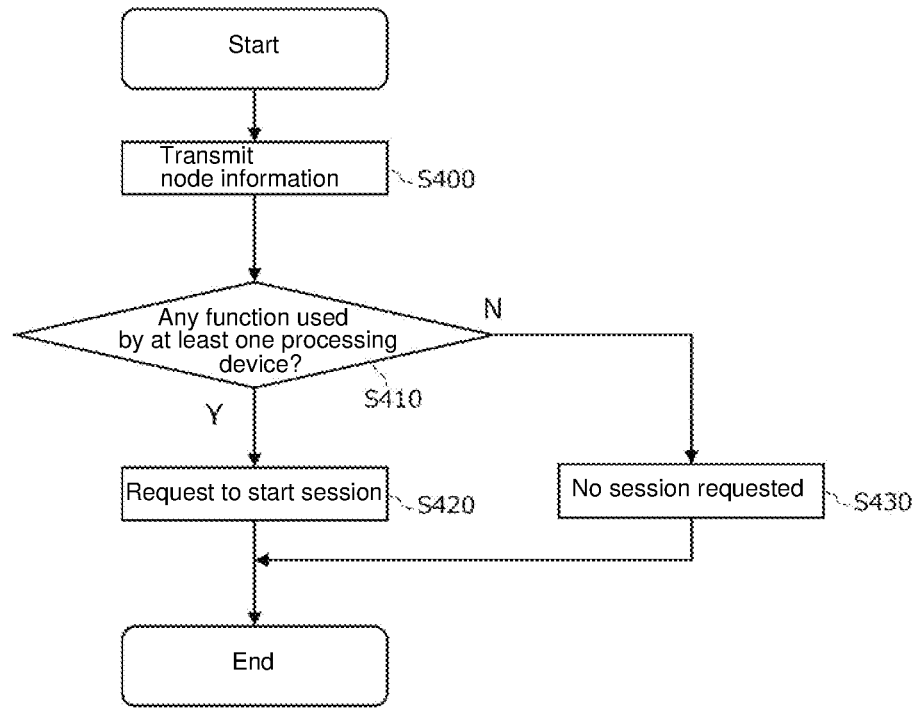
FIG. 12 is a flowchart of a process for determining session initiation between processing devices.
Figure 13:
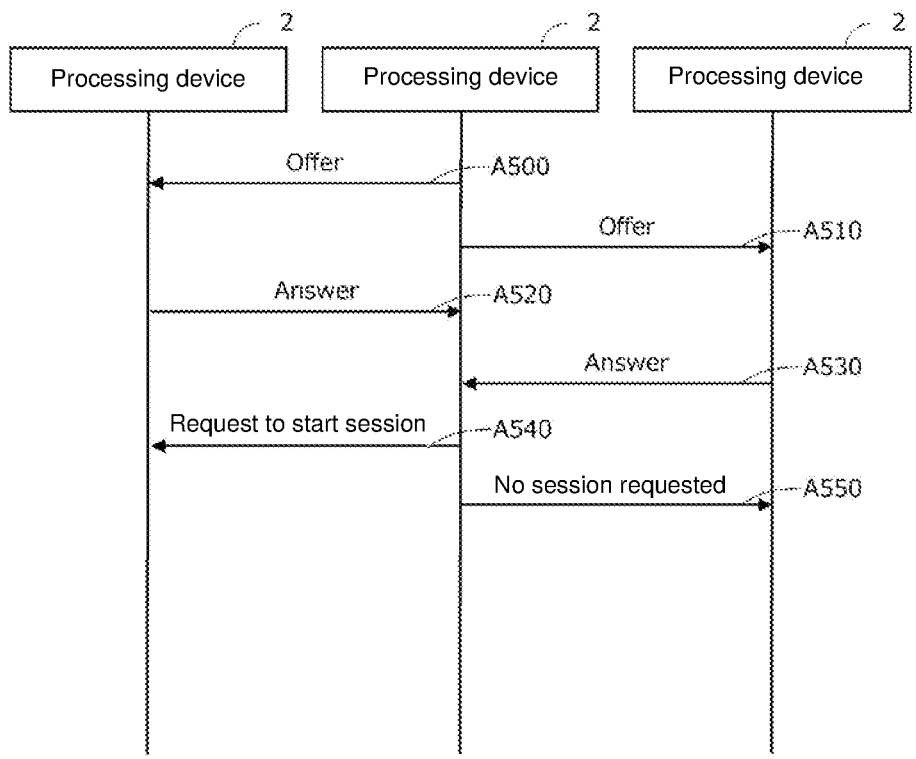
FIG. 13 is a timing chart of a session initiation process between the processing devices.

In S5, the link function unit 222 requests the other processing device 2 to start the session. With reference to FIGS. 12 and 13, the session initiation between the processing devices 2 will be described.

As described above, the link function unit 222 first transmits the node information to the other processing device 2 through the communicator 23 in processes S400, A500, and A510. In the present embodiment, the other processing device 2 to which the node information is to be transmitted has, but is not limited to, the same user ID as the processing device 2.

In a process S410, based on the node information, the link function unit 222 in the other processing device 2 that has received the node information then determines whether the processing device 2 that has transmitted the node information has a function to be used by at least one of the processing device 2 that has transmitted the node information or the other processing device 2 that has received the node information. In other words, the other processing device 2 that has received the node information starts a session with the processing device 2 that has transmitted the node information, and determines whether the logical network 3 is to be configured.

In the example described below, the processing device 2 that has transmitted the node information is the mobile terminal 2C, and the other processing device 2 that has received the node information is the navigation device 2A. The link function unit 222 included in the navigation device 2A compares the node information about the mobile terminal 2C received in the processes S400, A500, and A510 with the node information about the navigation device 2A generated in the processing in S5. The link function unit 222 included in the navigation device 2A determines whether the modules 4 in the navigation device 2A and in the mobile terminal 2C that implement the same function correspond to different software versions. The function in this example is requested by the mobile terminal 2C for the navigation device 2A and can be provided by the navigation device 2A to the mobile terminal 2C. When the modules 4 correspond to different software versions, the link function unit 222 included in the navigation device 2A determines that the navigation device 2A has a function to be used by the mobile terminal 2C.

For the function requested by the navigation device 2A from the mobile terminal 2C and to be provided by the mobile terminal 2C to the navigation device 2A, the link function unit 222 included in the navigation device 2A determines whether the modules 4 that implement the function correspond to different software versions. When the modules 4 correspond to different software versions, the link function unit 222 included in the navigation device 2A determines that the mobile terminal 2C has a function to be used by the navigation device 2A.

When the modules 4 correspond to different software versions, the implementation programs 242 included in software pieces corresponding to the modules 4 at least partially differ from each other. Of the implementation programs 242 that differ from each other, the implementation program 242 executed by the processing device 2 that has transmitted the node information corresponds to a first implementation program. Of the different implementation programs 242, the implementation program 242 executed by the other processing device 2 that has received the node information corresponds to a second implementation program. The second implementation program at least partially differs from the first implementation program. The link function unit 222 is not limited to a structure that compares software versions with each other. The link function unit 222 may have any structure that can determine whether the modules 4 have implementation programs 242 that at least partially differ from each other. Thus, the link function unit 222 may have any structure that determines whether the software pieces are generated or revised at the same position or different positions in a time-series sequence without comparing software versions from each other. Generating software indicates newly generating software having no former version, instead of revising existing software to generate a new version of the software.

Instead of comparing the software versions corresponding to the modules 4, the link function unit 222 may compare the versions of use-data used by the modules 4. In this case, when the versions of use-data are different from each other, the link function unit 222 determines that another processing device 2 has a function to be used by the processing device 2. Of the different pieces of use-data, the piece used to execute the first implementation program corresponds to first use-data. Of the different pieces of use-data, the piece used to execute the second implementation program corresponds to second use-data. The second use-data at least partially differs from the first use-data. The link function unit 222 is not limited to comparing the versions of use-data. The link function unit 222 may determine whether the modules 4 use pieces of use-data at least partially different from each other. Thus, the link function unit 222 may determine whether the use-data pieces are generated or revised at the same position or different positions in a time-series sequence without comparing use-data versions from each other. Generating use-data indicates newly generating use-data having no former version, instead of revising existing use-data to generate a new version of use-data.

The link function unit 222 may compare both the software versions and the use-data versions.

When the modules 4 in the processing device 2 and in the other processing device 2 use different implementation programs 242 or different use-data pieces, the processing devices 2 can obtain different implementation results although implementing the same function.

Thus, the link function unit 222 in the other processing device 2 that has received the node information determines whether to start a session with the processing device 2 that has transmitted the node information. The link function unit 222 in the other processing device 2 that has received the node information returns a determination result and the node information to the processing device 2 that has transmitted the node information in processes A520 and A530 through the communicator 23.

When receiving, from the other processing device 2, the node information and the determination result indicating that the other processing device 2 has a function to be used by at least one of the processing devices 2, the link function unit 222 in the processing device 2 that has transmitted the node information transmits a request for session initiation to the other processing device 2 through the communicator 23 in processes S420 and A540. When, from the other processing device 2, receiving a determination result indicating that the other processing device 2 does not have a function to be used, the link function unit 222 in the processing device 2 that has transmitted the node information transmits information indicating no session initiation to the other processing device 2 through the communicator 23 in processes in S430 and A550.

The other processing device 2 that has received the request for session initiation starts the session between the other processing device 2 and the processing device 2 that has requested session initiation and establishes the session. Each processing device 2 performs, for example, collection of address candidates to establish the session.

In addition to when the processing device 2 is newly connected to the logical network 3, the logical network 3 is configured when the processing device 2 updates software including the implementation program 242 or use-data such as map data 241. When the software including the implementation program 242 or the use-data is updated, the link function unit 222 reconnects the processing device 2 to the other processing device 2 to configure the logical network 3.

As described above, based on the second implementation program or the second use-data, the link function unit 222 in the processing device 2 forms the logical network 3 while being connected to, of the other processing devices 2 connectable through the communicator 23, the other processing device 2 that implements the same function as that implemented when the first implementation program is executed. Thus, the implementation result produced by the other processing device 2 when implementing the predetermined function can differ from that produced by the processing device when implementing its predetermined function. In other words, the processing device 2 forms the logical network 3 with another processing device 2 that can produce a different implementation result, instead of another processing device 2 that produces the same implementation result as the processing device 2 when it implements the predetermined function. Thus, the logical network 3 formed by the processing device 2 can connect with limited processing devices 2 that produce effective results when implementing the predetermined function and can lower the management cost.

Detailed Components of Devices Configuring Logical Network 3

The server group 2Z includes two or more servers 2B for, for example, information processing load sharing and data backup. The two or more servers 2B, which are classified in accordance with the functions, have the same function.

To implement the link function, transmission information transmitted and received between the processing devices 2 includes at least one of a user ID, a command ID, a request ID, information indicating a time stamp, or information indicating the result. The user ID is identification information that identifies a user of the corresponding processing device 2. The command ID is identification information indicating a command to be executed. The request ID is unique identification information provided to each command. The time stamp indicates time when information to be transmitted is transmitted. Information indicating the result indicates the result produced after the command associated with the command ID is executed.

When transmitting a command to implement a predetermined function to the other processing device 2, each processing device 2 transmits transmission information including at least the command ID or the request ID to the other processing device 2. When transmitting the result of executing the command to the other processing device 2, each processing device 2 transmits the transmission information including information indicating at least the request ID or the result to the other processing device 2.

When the transmission information is transmitted from the navigation device 2A or the mobile terminal 2C to the server group 2Z, the information processing system 1 allocates the transmission information to different servers 2B to share the processing load of the servers 2B. The information processing system 1 allocates the transmission information for each corresponding processing device 2. Information in the server 2B to which the transmission information is allocated is stored in the server 2B for at least a predetermined period. When next transmission information is transmitted within the predetermined period, the transmission information is reallocated to the same server 2B. When the predetermined period elapses, information in the server 2B to which the transmission information is allocated is reset.

To implement the link function, each processing device 2 performs communications called a heartbeat with the signaling server 2B1. The signaling server 2B1 performs a heartbeat to determine whether each processing device 2 is online or offline.

Figure 14:
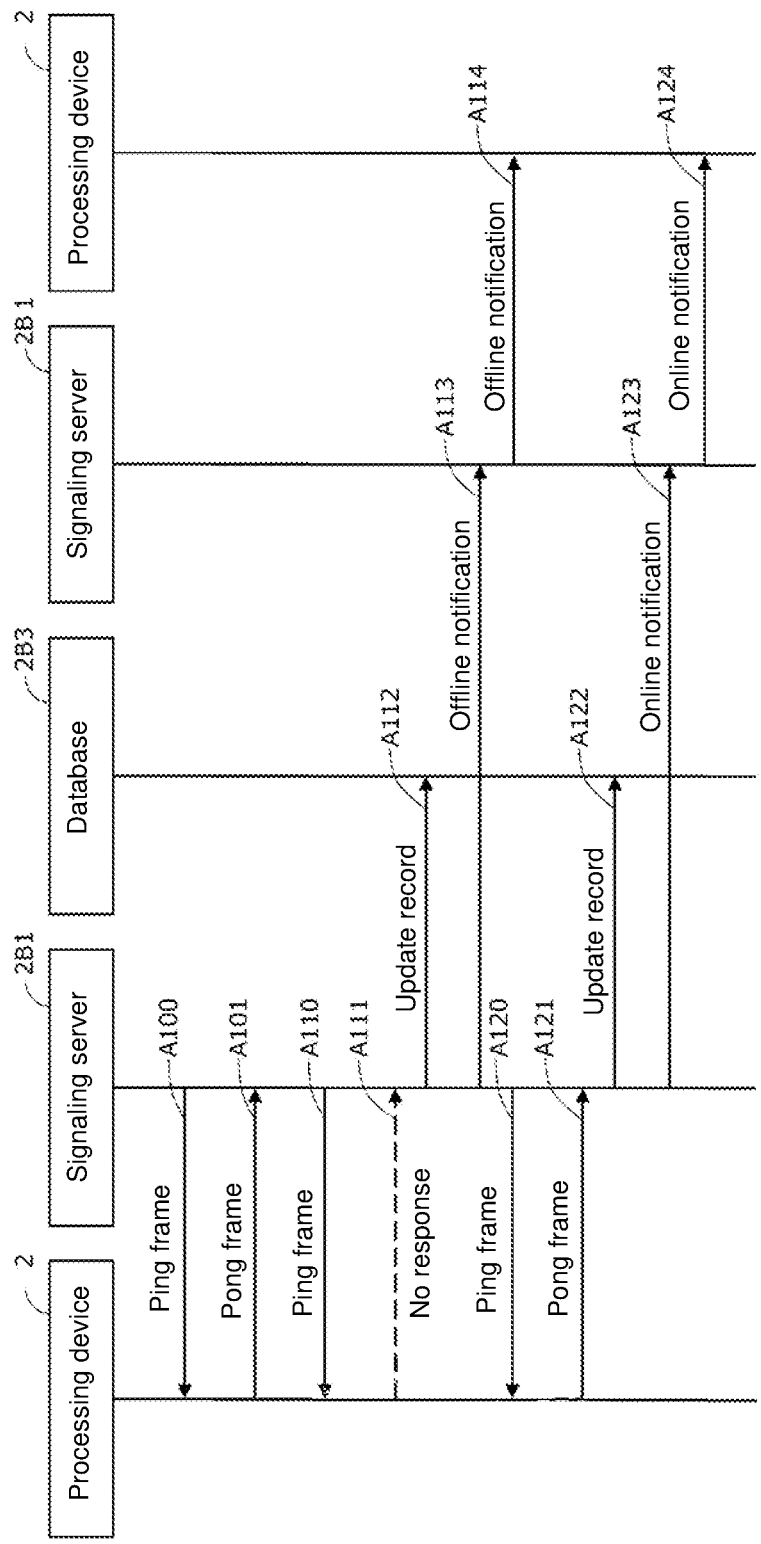
FIG. 14 is a chart of a specific example process associated with a heartbeat.

As shown in FIG. 14, the signaling server 2B1 transmits a ping frame to the processing device 2, and the status determiner 221 in the processing device 2 returns a pong frame to the signaling server 2B1. The communications are described more specifically below.

A specific example of the heartbeat is described using a configuration including two processing devices 2, two signaling servers 2B1, and the database 2B3. The database 2B3 is one of servers included in the server group 2Z. When one signaling server 2B1 transmits a ping frame to one processing device 2 in a process A100, the processing device 2 that has received the ping frame returns a pong frame to the signaling server 2B1 in a process A101. The transmission and reception of the ping frame and the pong frame are performed at a predetermined time interval. The predetermined time interval may be regular or irregular. While such transmission and reception of the ping and pong frames are normally performed, the processing devices 2 are online. When, for example, the signaling server 2B1 receives no response from the processing device 2 as in a process A111 despite transmitting the ping frame to the processing device 2 in a process A110, the processing device 2 is offline. In this state, the signaling server 2B1 requests the database 2B3 to update the record managing the communication status in a process A112. Then, the record managing the communication status of the database 2B3 is updated. In a process A113, the signaling server 2B1 also notifies the other signaling server 2B1 that the processing device 2 is offline.

The other signaling server 2B1 obtains the communication status of the other processing device 2. In a process A114, the other signaling server 2B1 notifies the other processing device 2 that the processing device 2 is offline.

Also, when the processing device 2 is offline, the signaling server 2B1 transmits the ping frame to the processing device 2 at predetermined time intervals in a process A120. The predetermined time intervals may be regular or irregular. When the processing device 2 becomes online, the processing device 2 returns the pong frame in a process A121. The signaling server 2B1 requests the database 2B3 to update the record managing the communication status in a process A122. In a process A123, the signaling server 2B1 notifies the other signaling server 2B1 that the processing device 2 is online. In a process A124, the other signaling server 2B1 notifies the other processing device 2 that the processing device 2 is online.

Such transmission and reception of the ping and pong frames allow the signaling server 2B1 to obtain the communication statuses of the processing devices 2. For the processing device 2 being the navigation device 2A, for example, the navigation device 2A receiving a ping frame from the signaling server 2B1 when a vehicle has entered a place that radio waves do not reach, such as a tunnel or an underground parking place, does not transmit a pong frame. In such a case, each processing device 2 included in the logical network 3 determines that the navigation device 2A is offline with the above processes. The communication status of the processing device 2 may be obtained with a method other than a heartbeat.

When implementing the link function, the function implementer 211 determines the priority of the modules 4 based on a predetermined selection reference, and selects a first candidate with a highest priority, and a second candidate with a second highest priority following the first candidate. The first candidate is the module 4 that is estimated to produce a highest implementation result. The second candidate is the module 4 that can implement the same function as the first candidate and that is estimated to produce a second best implementation result following the first candidate. Examples of the selection reference for the module 4 include the receivability of more accurate implementation results and faster receivability of implementation results. The function implementer 211 selects the first and second candidates based on one of the version for the module 4, the version of the map data 241, or the communication speed. The communication speed is a volume of data transmittable and receivable per unit time between the processing device 2 that transmits commands to implement a predetermined function and another processing device 2. The function implementer 211 selects the first and second candidates from the modules 4 incorporated in the processing devices 2 that are online. More specifically, the modules 4 incorporated in the processing devices 2 that are offline are not selected as the first and second candidates. When the version for the module 4 is used as the selection reference, the function implementer 211 raises the priority of the module 4 having a newer version. When the version of the map data 241 is used as the selection reference, the function implementer 211 raises the priority of the module 4 with a newer version. When the communication speed is used as the selection reference, the function implementer 211 raises the priority of the module 4 incorporated in the processing device 2 with a higher communication speed. The selection reference may be predetermined, or the processing device 2 may allow a user to change the selection reference. In this case, the selection reference may be stored in the storage 24. The processing device 2 may determine the selection reference through machine learning.

The function implementer 211 selects the first and second candidates from the two or more processing devices 2 included in the logical network 3. The processing device 2 can transmit and receive the implementation result of the predetermined function by communicating through the communicator 23 with another processing device 2 forming the logical network 3. When the implementation result that the processing device 2 can obtain from the other processing device 2 is the same as the implementation result produced by the module 4 included in the processing device 2, the processing device 2 has less intention to receive the implementation result from the other processing device 2. Thus, the function implementer 211 selects the first and second candidates from the two or more processing devices 2 included in the logical network 3. The logical network 3 includes the processing devices 2 connected to each other and different from each other in at least the versions of the software including the implementation program 242 that the devices have or the versions of the use-data that the devises use to execute the implementation program 242. Thus, the function implementer 211 selects the first and second candidates from the two or more processing devices 2 that can implement the same function using software including the different implementation programs 242 or use-data such as the different pieces of the map data 241. The logical network 3 is less likely to include the processing device 2 with less use. Thus, the information processing system 1 can effectively reduce the first and second candidates selectable by the function implementer 211 and thus can reduce the processing load.

The function implementer 211 transmits a command to implement the predetermined function to each of the first and second candidates. Transmission in this case refers to transmitting a command, or transmitting information, and does not include confirming the transmission. The function implementer 211 simultaneously transmits commands to the first and second candidates. When the function implementer 211 can perform multiple processes in parallel, the function implementer 211 performs the process for transmitting a command to the first candidate and the process for transmitting a command to the second candidate in parallel. When the function implementer 211 cannot perform parallel processing, the function implementer 211 sequentially performs the process for transmitting a command to the first candidate and the process for transmitting a command to the second candidate. In this case, the function implementer 211 transmits a command to the second candidate immediately after transmitting the command to the first candidate. Transmitting immediately after transmitting the command to the first candidate refers to transmitting, without any delay, after transmitting the command to the first candidate. The function implementer 211 may transmit the command to the second candidate within one second after transmitting the command to the first candidate. In some embodiments, the function implementer 211 may transmit the command to the second candidate within 0.5 seconds, 0.1 seconds, 0.05 seconds, or 0.01 seconds after transmitting the command to the first candidate. Thus, the function implementer 211 can transmit a command to the second candidate before identifying the first implementation result. The specific example of transmitting these commands is described later. When the function implementer 211 cannot perform parallel processing, the function implementer 211 may transmit commands to the first candidate and the second candidate through time-division virtual parallel processing.

The function implementer 211 uses the implementation result of the first or second candidate. When obtaining the implementation result of the first candidate within a predetermined time, the function implementer 211 determines to display the implementation result of the first candidate on the display 26 and to output the implementation result from the audio output unit 27. When obtaining no implementation result of the first candidate in the predetermined time, the function implementer 211 determines to display the implementation result of the second candidate on the display 26 and to output the implementation result from the audio output unit 27. When the first or second candidate is included in the processing devices 2 including the function implementer 211, the function implementer 211 obtains the implementation result of the first or second candidate of the processing device 2. When the first or second candidate is included in the processing devices 2 other than the processing devices 2 including the function implementer 211, the function implementer 211 obtains the implementation result of the first or second candidate through the communicator 23.

The communication controller 212 controls the communicator 23 to transmit and receive transmission information between the processing devices 2. More specifically, the communication controller 212 manages connection established between the processing devices 2, and identifies the processing device 2 with which the communication controller 212 is to communicate. The communication controller 212 specifies the destination to which a command is transmitted to implement a function and thus specifies another processing device 2 including the first or second candidate and controls the communicator 23 to transmit a command to the specified processing device 2. The communication controller 212 specifies an implementation result transmitted from the specified processing device 2 as the implementation result transmitted from the processing device 2 that has transmitted the command.

The output controller 213 controls the display 26 and the audio output unit 27. The output controller 213 outputs, to the display 26, image data generated using information based on the implementation result of the first or second candidate and outputs audio data to the audio output unit 27.

The guide 214 generates information to guide the user through a route with at least one of sound or display.

The searcher 215 searches for a facility through the operation unit 25 based on the map data 241 and based on information such as the facility name and the telephone number input by the user. Examples of the facility include a gas station, a charging station, a hospital, a police station, a fire station, a train station, a convenience store, a park, a mountain, and other specific places. The map data 241 includes various items of information used for displaying a routing guide and a map. The map data 241 includes road information and facility information. The road information includes a combination of nodes and links. Each node is set at, for example, an intersection or an end of a road. Each link is set at, for example, a position connecting adjacent nodes. The facility information indicates buildings or points of interests (POIs). This map data may include, for each link, information indicating the shape of the road, the latitude and the longitude of the road, the curvature of the road, the gradient of the road, the orientation of the road, and the travel direction of the road. The map data may also include information associated with the road type such as an expressway or an ordinary road. The map data typically corresponds to more recent situations as the data is of a newer version. The map data includes, for example, data pieces corresponding to multiple parcels. The parcels are formed by dividing the surface of the earth into rectangles of a predetermined size based on the latitude and the longitude.

The explorer 216 explores the route from the departure point to the destination based on the map data 241.

The map drawer 217 generates data to display a map on the display 26 based on the map data 241. This map shows, for example, the current location of a vehicle with the processing device 2 or a person carrying the processing device 2, and the route from the current location to the destination. In the present embodiment, the vehicle is an automobile. The vehicle may be, for example, a motorcycle, a bicycle, or a train.

The traffic information unit 218 performs various processes associated with traffic information. In the present embodiment, in the navigation device 2A and the mobile terminal 2C, the traffic information unit 218 provides the traffic information to the user as appropriate. The traffic information is provided through display on the display 26 or with sound output from the audio output unit 27. Examples of the traffic information include traffic jam information, information about cars involved in an accident, and information about any unsafe situation around or ahead the route. For example, in the navigation device 2A, the traffic information unit 218 may transmit information such as time, position information, or identification information identifying the navigation device 2A to the server 2B.

The map matcher 219 performs map matching based on the position information indicating the current location. For example, the map matching includes correction of latitude information and longitude information obtained by a global positioning system (GPS) sensor installed in a vehicle to a position on the road indicated by the map data. The map matcher 219 superimposes the current location of the vehicle indicated by the latitude information and the longitude information onto the map information and obtains a link corresponding to the superimposed position. Information about the current location used by the map drawer 217 is information about the current location corrected by the map matcher 219. The map matcher 219 may obtain information about the current location such as the latitude information and the longitude information using the positioning unit 28 installed in the processing device 2 instead of the GPS included in the vehicle.

The difference updater 220 updates the map data 241 stored in the storage 24. For example, the navigation device 2A automatically performs a map update or a process for updating the map data 241A. The navigation device 2A downloads map difference data from the server 2B at a predetermined timing, and writes the downloaded map difference data to the navigation storage 24A or a recording medium (not shown). The recording medium is, for example, a secure digital (SD) card. The recording medium is connected to the navigation device 2A through an interface (not shown) in the navigation device 2A. The map difference data is a part of map data different from the corresponding part of map data of a previous version. The map difference data is obtained per, for example, parcel unit. The processing device 2 using the map difference data for a map update can further reduce the time taken for the map update as compared with when the entire map data is downloaded.

To obtain the status of the processing device 2, the status determiner 221 transmits a pong frame to the other signaling server 2B1 through the communicator 23.

The communicators 23 include the navigation communicator 23A, the server communicator 23B, and the mobile communicator 23C. The communicators 23 communicate through the network by transmitting and receiving data to and from each other. The navigation communicator 23A has, for example, a communication component such as a telecommunication control unit or a telematics control unit (TCU) or a data communication module (DCM).

The operation units 25 include the navigation operation unit 25A and the mobile operation unit 25C. Each operation unit 25 detects a user instruction and outputs information indicating a detected operation to the controller 21. When the navigation display 26A and the mobile display 26C are touch screens, the navigation operation unit 25A and the mobile operation unit 25C are also touch screens.

The displays 26 include the navigation display 26A and the mobile display 26C. The displays 26 display a map based on the map data 241. Each display 26 is, for example, a liquid crystal display or an organic electroluminescent (EL) display.

The storages 24 include the navigation storage 24A, the server storage 24B, and the mobile storage 24C. The storages 24 store various items of information. In the present embodiment, the storages 24 store the map data 241 and software. The software includes various programs executable by the processing devices 2. Examples of these programs include a program for activating each processing device 2, a program for a map update, and an implementation program 242 for performing an operation of, for example, searching, exploring, or a link function.

The audio output units 27 include the navigation audio output unit 27A and the mobile audio output unit 27C. Each audio output unit 27 outputs guide information with sound to guide the user along the route. The audio output unit 27 is a speaker.

The positioning unit 28 includes the mobile positioning unit 28C. The positioning unit 28 obtains the current location of the processing device 2 including the positioning unit 28 as the latitude information and the longitude information. The positioning unit 28 is, for example, a GPS sensor.

Process for Obtaining Implementation Result

With reference to flowcharts shown in FIGS. 15 to 17, a process for obtaining implementation results using the first and second candidates to implement a predetermined function will now be described. In the example described below, the processing device 2 that outputs the implementation result to the display 26 and the audio output unit 27 is referred to as a current node. The current node corresponds to a first processing device. More specifically, in many cases, the current node is the processing device 2 operated by the user. The current node is, for example, the navigation device 2A. The processing device 2 other than the current node is referred to as another node. The other node is, for example, the mobile terminal 2C or the server 2B. The other node corresponds to a second processing device.

Figure 15:
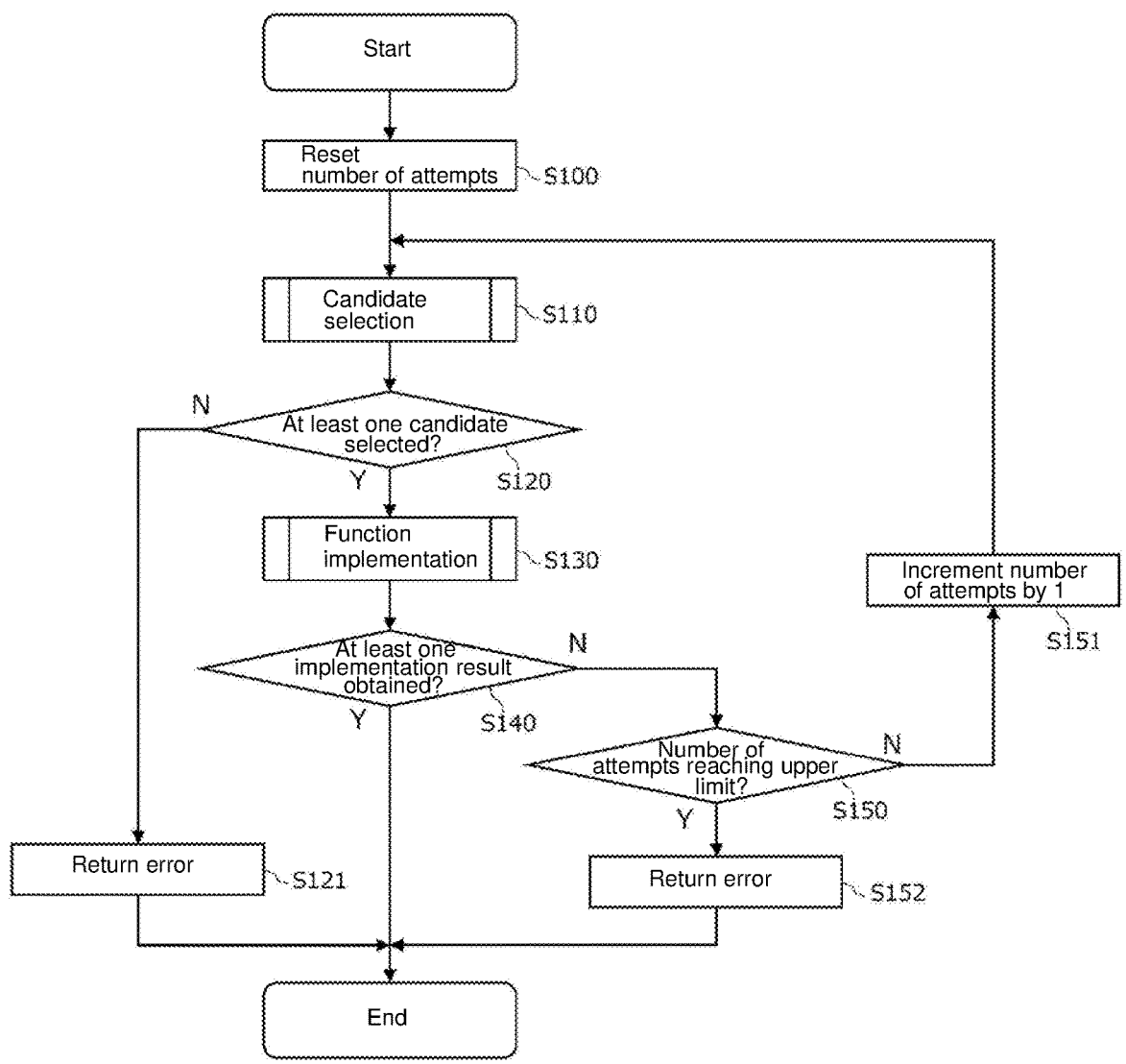
FIG. 15 is a flowchart of a process for obtaining a result of implementing a predetermined function.

As shown in FIG. 15, the function implementer 211 first resets the number of attempts to zero in S100. The function implementer 211 then performs a candidate selection process in S110.

In the present embodiment, the candidate selection process is performed by, but not limited to, the function implementer 211 in the current node. The function implementer 211 in the other node may select the first and second candidates. Information about the first and second candidates selected by the function implementer 211 in the other node may be transmitted to the current node. In this structure, the function implementer 211 in the current node determines whether to accept the selection result from the function implementer 211 in the other node. In this structure as well, the function implementer 211 in the current node selects the first and second candidates.

Candidate Selection Process

Figure 16:
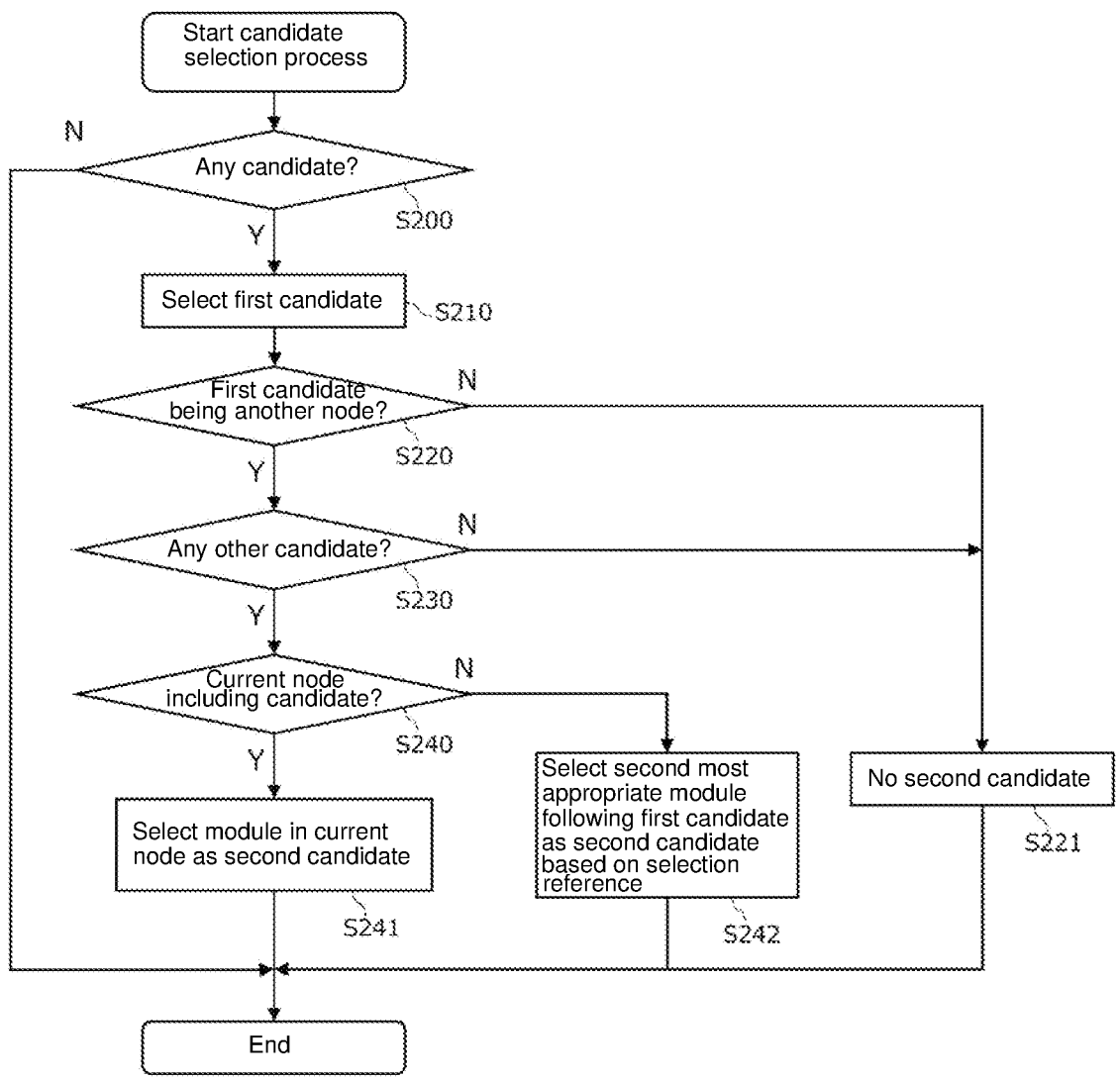
FIG. 16 is a flowchart of a candidate selection process.

In S200 in a candidate selection process shown in FIG. 16, the function implementer 211 first determines whether the logical network 3 includes any module 4 serving as a candidate. More specifically, the function implementer 211 determines whether to implement an intended predetermined function. In S200, unless the logical network 3 includes any module 4 that can implement the predetermined function, the function implementer 211 ends the candidate selection process.

When the logical network 3 includes modules 4 that can implement the predetermined function in S200, the function implementer 211 selects a first candidate in S210 from the modules 4 based on the predetermined selection reference. The selection reference is described above and will not be described repeatedly.

In S220, the function implementer 211 then determines whether the selected first candidate is another node. When the selected first candidate is the module 4 in the current node and is not the module 4 in another node, the function implementer 211 ends the candidate selection process in S221 without selecting a second candidate. When the first candidate is the module 4 in another node, the function implementer 211 determines whether the logical network 3 includes candidates other than the first candidate in S230. When the logical network 3 includes no candidates other than the first candidate, the function implementer 211 ends the candidate selection process in S221 without selecting a second candidate.

When the logical network 3 includes modules 4 serving as candidates other than the first candidate, the function implementer 211 determines whether the module 4 serving as a candidate is included in the current node in S240. When the module 4 serving as a candidate is included in the current node, the function implementer 211 selects the module 4 included in the current node as the second candidate in S241. When no module 4 serving as a candidate is included in the current node, the function implementer 211 selects the second most appropriate module 4 following the first candidate as the second candidate based on the selection reference in S242 and ends the candidate selection process.

As shown in FIG. 15, when no candidate for the module 4 that implements a predetermined function is selected in the candidate selection process in S120, the function implementer 211 notifies the user of an error in S121 through the display 26 and the audio output unit 27. The function implementer 211 notifies the controller 21 of the error. When at least one candidate for the module 4 that implements a predetermined function is selected, the function implementer 211 advances to a function implementation process in S130.

Function Implementation Process

Figure 17:
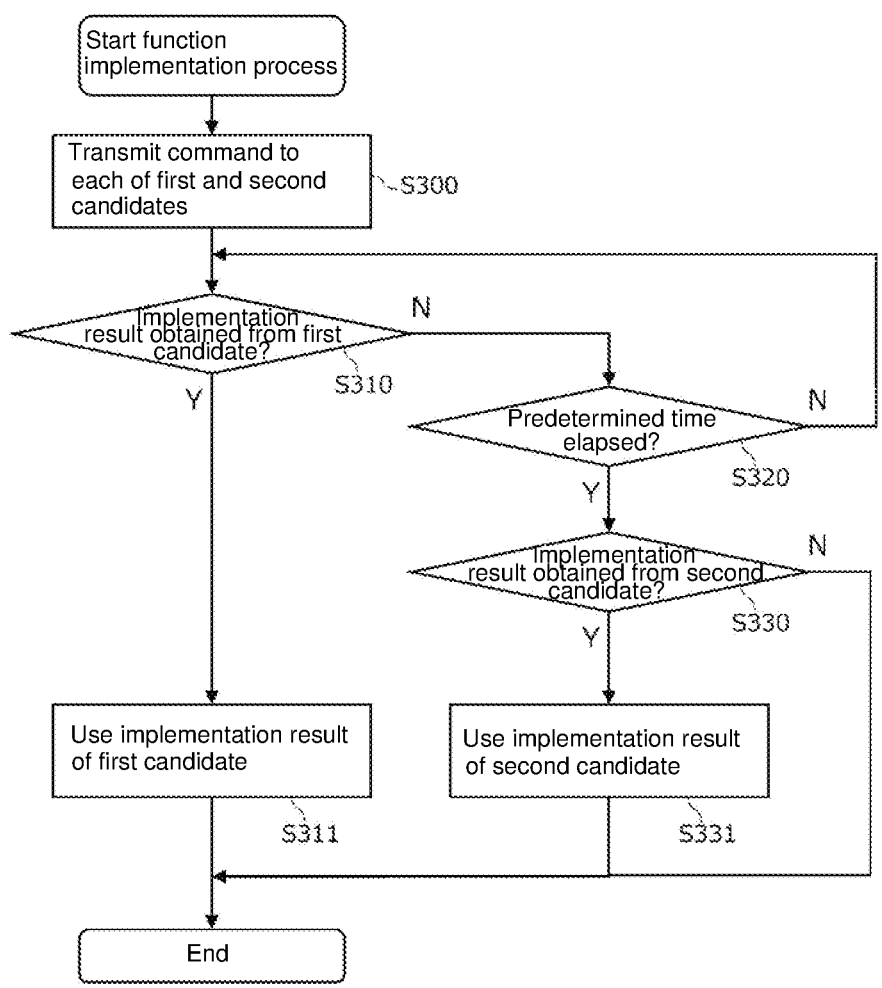
FIG. 17 is a flowchart of a function implementation process.

In the function implementation process in FIG. 17, the function implementer 211 first transmits commands to implement a predetermined function to the first and second candidates in S300. When obtaining an implementation result from the first candidate within a predetermined time, the function implementer 211 then uses the implementation result of the first candidate in S311. More specifically, the function implementer 211 outputs image data to the display 26 and outputs audio data to the audio output unit 27 based on information about the implementation result of the first candidate.

When obtaining no implementation result from the first candidate after the predetermined time elapses, the function implementer 211 determines whether the function implementer 211 has obtained an implementation result from the second candidate in S330.

When the function implementer 211 obtains an implementation result from the second candidate, the function implementer 211 uses the implementation result of the second candidate in S331. When obtaining no implementation result from the second candidate, the function implementer 211 ends the process.

The implementation result obtaining process in FIG. 15 is described again. In S140 of the function implementation process, when obtaining an implementation result from at least one of the first or second candidate, the function implementer 211 ends the implementation result obtaining process. When obtaining no implementation result from any of the first and second candidates in S140, the function implementer 211 obtains the current number of attempts. In S150, when the number of attempts is less than the upper limit of the number of attempts, the function implementer 211 increments the number of attempts by one in S151 and repeats the processing in S110 and subsequent steps. When the number of attempts reaches the upper limit of the number of attempts, the function implementer 211 notifies the user of an error through the display 26 and the audio output unit 27 in S152. The function implementer 211 also notifies the controller 21 of the error.

More specifically, the function implementer 211 selects the first and second candidates up to the upper limit of the number of attempts to attempt to obtain an implementation result. When obtaining the implementation result of the first candidate within a predetermined time, the controller 21 uses the implementation result of the first candidate. When obtaining no such implementation result, the controller 21 uses the implementation result of the second candidate.

In the candidate selection process shown in FIG. 16, the first candidate may be included in either the current node or the other node. The function implementer 211 does not select a second candidate when the first candidate is included in the current node. Instead, the function implementer 211 may select a second candidate when the first candidate is included in the current node. In the candidate selection process, both the first and second candidates may be modules 4 included in other nodes.

The process in Examples and Comparative Examples from when a command to implement a predetermined function is transmitted from the processing device 2 to the first and second candidates to when the implementation result is received is specifically described with reference to timing charts.

Command Transmission in Example 1

Figure 18:
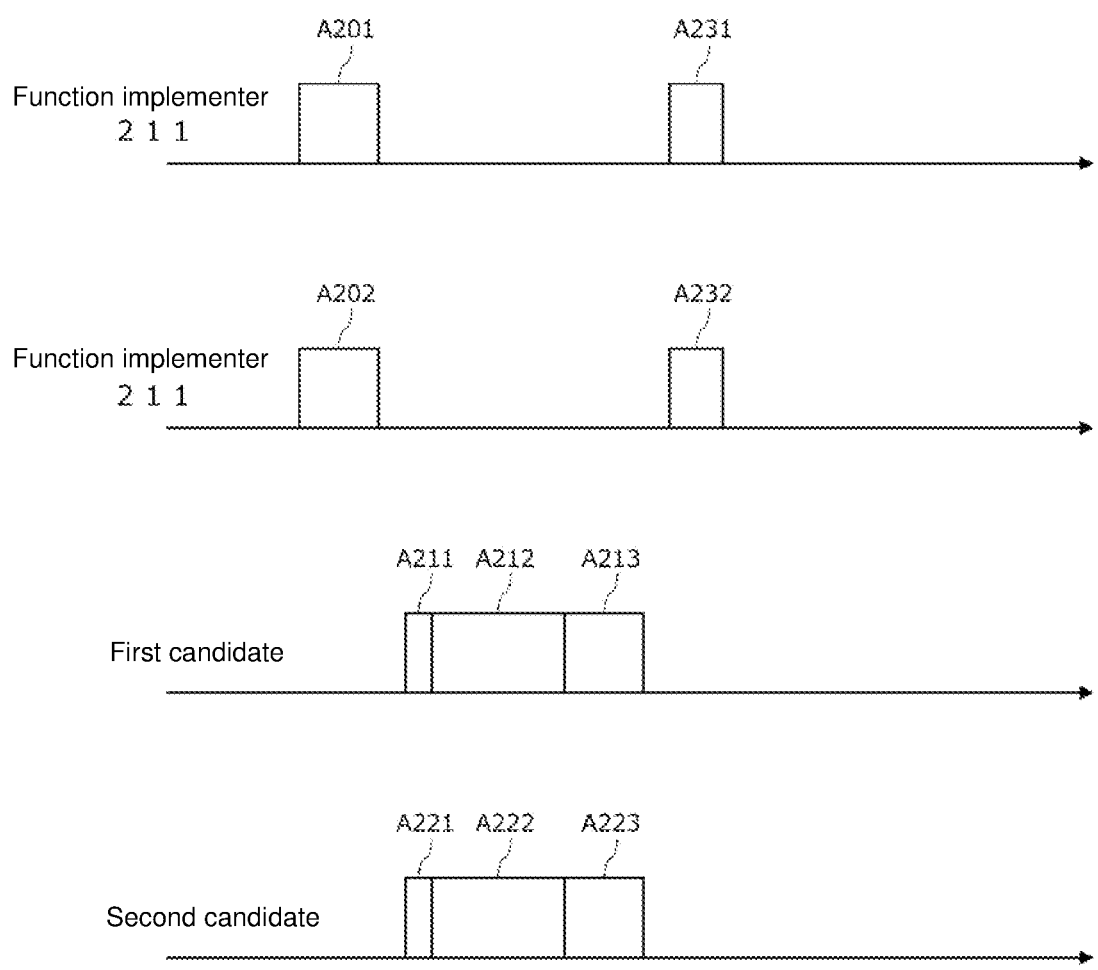
FIG. 18 is a timing chart of a command transmission process in Example 1.

As shown in FIG. 18, when the processing device 2 includes two or more processing cores such as CPUs, the function implementer 211 performs a process A201 of transmitting a command to the first candidate and a process A202 of transmitting a command to the second candidate in parallel. When receiving commands from the function implementer 211, the first and second candidates perform processes A211 and A221 of receiving the commands, and processes A212 and A222 of executing the commands. The first and second candidates then perform processes A213 and A223 of transmitting the implementation results. The function implementer 211 then receives the implementation results and performs processes A231 and A232 of identifying the respective implementation results. When the first or second candidate is included in the current node, a command is transmitted through, for example, a bus. When the first or second candidate is included in the other node, the command is transmitted through the communicator 23.

Command Transmission in Comparative Example

Figure 19:
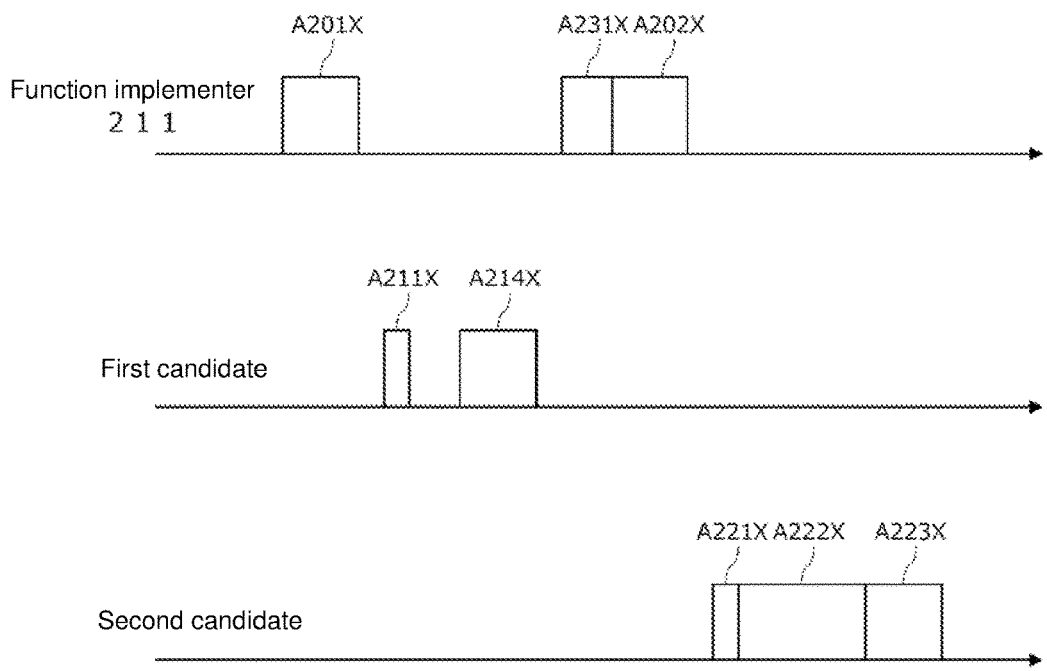
FIG. 19 is a timing chart of a command transmission process in Comparative Example.

With reference to the Comparative Example shown in FIG. 19, after performing a process A201X of transmitting a command to the first candidate, the function implementer 211 does not immediately transmit the command to the second candidate. When performing a process A211X of receiving the command, the first candidate then performs a process A214X of transmitting information indicating that the processing device 2 including the first candidate is busy and cannot execute the command. When the function implementer 211 that has transmitted the command to the first candidate performs a process A231X of receiving the information indicating that the processing device 2 including the first candidate is busy, the function implementer 211 performs a process A202X of transmitting a command to the second candidate. When performing a process A221X of receiving the command, the second candidate performs a process A222X of executing the command, and performs a process A223X of transmitting an implementation result. In this Comparative Example, the time taken for the function implementer 211 to receive an implementation result from the second candidate is longer than the time taken in Example 1 described above.

Command Transmission in Example 2

Figure 20:
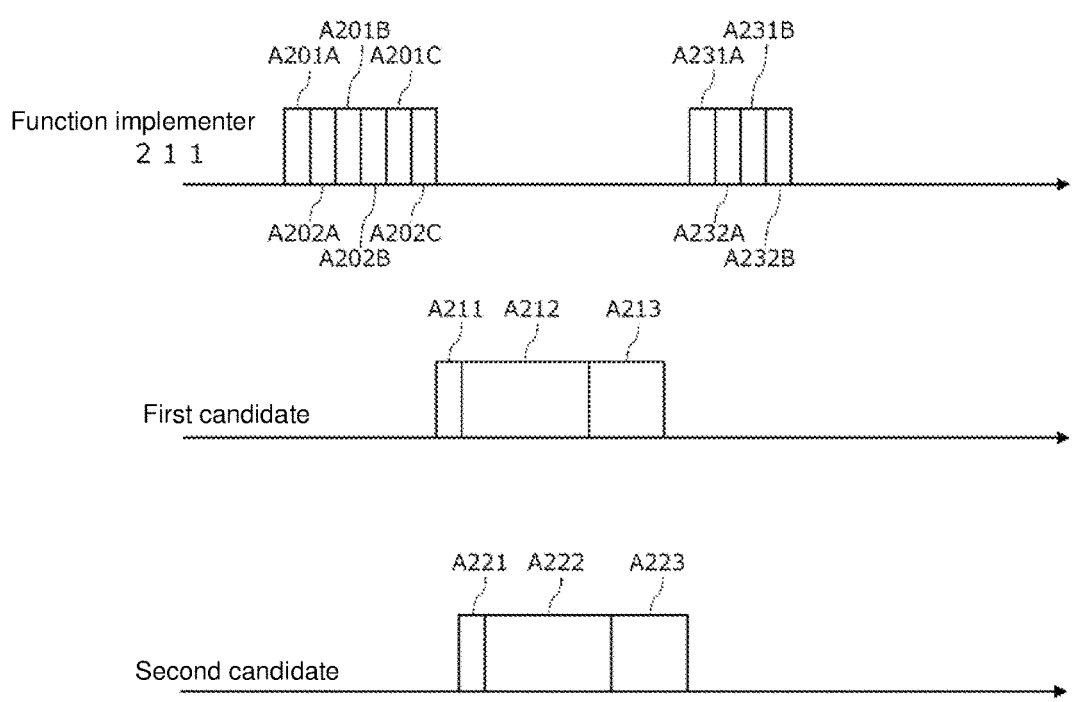
FIG. 20 is a timing chart of a command transmission process in Example 2.

As shown in FIG. 20, when the processing device 2 simply includes one processing core such as a CPU, the function implementer 211 performs processes A201A, A201B, and A201C of transmitting a command to the first candidate and processes A202A, A202B, and A202C of transmitting a command to the second candidate through time-division virtual parallel processing. The first and second candidates then perform processes A211 and A221 of receiving the respective commands, perform processes A212 and A222 of executing the commands, and then perform processes A213 and A223 of transmitting the implementation results. The function implementer 211 then receives the implementation results and performs processes A231A, A231B, A232A, and A232B of identifying the respective implementation results. In this case, the command is transmitted to the first candidate earlier than being transmitted to the second candidate, although the command transmission to the first and second candidates occurs later than in Example 1. However, the time taken for the function implementer 211 to receive the implementation result from the second candidate is shorter than the time taken in the Comparative Example.

In the information processing system 1, the function implementer 211 transmits a command to the second candidate immediately after transmitting a command to the first candidate. The commands are transmitted in various manners. In either manner, the function implementer 211 transmits a command to the second candidate before receiving the implementation result from the first candidate. In other words, the time from when the function implementer 211 transmits a command to the first candidate to when the function implementer 211 receives the first implementation result overlaps the time from when the function implementer 211 transmits a command to the second candidate to when the function implementer 211 receives the second implementation result. More specifically, unlike in the Comparative Example, the function implementer 211 transmits a command to the second candidate without any delay, without obtaining the result of command transmission to the first candidate.

In the information processing system 1, as described above, the function implementer 211 in the processing device 2 transmits commands to implement a predetermined function to the first and second candidates and receives the first and second implementation results. Thus, the function implementer 211 can perform subsequent processes based on the first and second implementation results. For example, when the first implementation result is determined as being less reliable, the second implementation result, which is more highly reliable, may be used. Command transmission to the second candidate without waiting for the first implementation result can reduce a time lag to obtain a highly reliable implementation result.

In the information processing system 1, the function implementer 211 in the processing device 2 transmits a command to the second candidate after transmitting a command to implement the predetermined function to the first candidate and before receiving a response to the command from the first candidate. The response from the first candidate includes receiving an implementation result and receiving information indicating that, for example, the processing device 2 including the first candidate is busy. The information processing system 1 can thus obtain the implementation result earlier than the structure that transmits a command to implement a predetermined function to the second candidate after failing to obtain an implementation result of the predetermined function from the first candidate. In addition, the information processing system 1 can use an implementation result of the second candidate of an old version when selecting, as the first candidate, a module with a newer version than the second candidate but failing to obtain the implementation result of the first candidate for a long time.

The information processing system 1 can receive the first and second implementation results. Thus, the information processing system 1 can increase the reliability of the implementation results using the second implementation result although the received first implementation result is unusable due to, for example, inappropriate data.

In the information processing system 1, when the function implementer 211 cannot obtain the first implementation result serving as the implementation result of the first candidate after a predetermined time elapses following transmission of commands to the first and second candidates, the function implementer 211 may output image data or audio data indicating the second implementation result serving as the implementation result of the second candidate to the display 26 or the audio output unit 27. When obtaining the first implementation result takes time, the information processing system 1 causes the display 26 to display an image and causes the audio output unit 27 to output sound based on the second implementation result to avoid a long time taken to output an implementation result serving as a result of implementing the predetermined function.

When the communication speed is used as the selection reference for the function implementer 211 to select the first and second candidates, the information processing system 1 can obtain the result of implementing the predetermined function much earlier. When the version for the module 4 is used as the selection reference, the information processing system 1 can obtain a far more reliable result as the result of implementing the predetermined function. When the version of the map data 241 is used as the selection reference, for example, the information processing system 1 can obtain the result of exploring the route based on the newer map data 241.

When the version of the map data 241 in the processing device 2 including the function implementer 211 that has transmitted the command differs from the version of the map data 241 in the processing device 2 including the first or second candidate that has received the command, the implementation result and the map data 241 may contradict each other. More specifically, for example, the map data 241 corresponding to the road serving as the route to the destination may not be included in the map data 241 in the function implementer 211 that has transmitted the command. In such a case, the function implementer 211 requests the processing device 2 including the first or second candidate to transmit the portion of the map data used to display the implementation result. For example, the function implementer 211 requests the processing device 2 including the first or second candidate to transmit data about a parcel including the route from the current location to the destination. Thus, the processing device 2 serving as the current node can reduce a contradiction in using the implementation result of the first or second candidate.

Although the route has no contradiction, the different versions of the map data 241 may have different pieces of information about the facilities along the route. In such a case, the function implementer 211 in the current node may request the processing device 2 including the first or second candidate to transmit data about a parcel including the route from the current location to the destination as in the above case.

The function implementer 211 may select at least one of the first or second candidate from the module 4 included in the current node. The function implementer 211 can normally obtain the implementation result from the module 4 included in the current node. Thus, the function implementer 211 can avoid a failure in obtaining the implementation result of the predetermined function.

When obtaining no implementation result from either of the first and second candidates after a predetermined time elapses, the function implementer 211 may reselect first and second candidates based on the predetermined selection reference. Thus, the function implementer 211 can perform the process for obtaining an implementation result again when obtaining no implementation result from either of the first or second candidate due to a change of the communication status. In the present embodiment, the function implementer 211 reselects the first and second candidates using the order obtained in the previous candidate selection process. The function implementer 211 selects, as a new first candidate, the module 4 with the order following the second candidate selected in the previous candidate selection process. The function implementer 211 selects, as a new second candidate, the module 4 with the order following the newly selected first candidate. Instead, the function implementer 211 may use a different selection reference to perform the candidate selection process again.

The function implementer 211 selects the first and second candidates simply from the modules 4 included in the processing device 2 that is online. Thus, the function implementer 211 can remove the modules 4 included in the processing device 2 that is offline from the candidates, and thus can avoid a failure in obtaining the implementation results from the modules 4.

Embodiment Using Hardware

Figure 21:
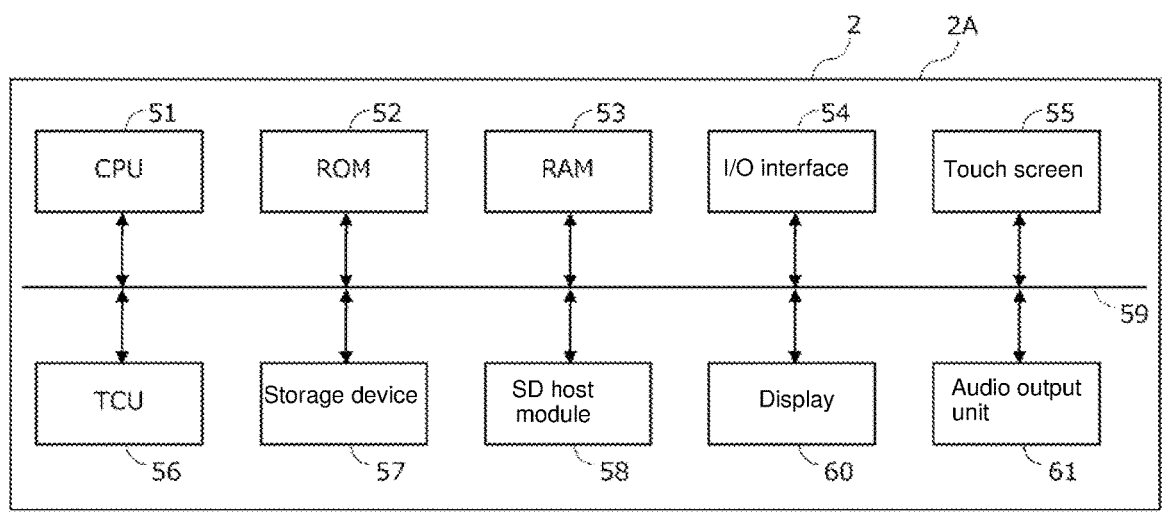
FIG. 21 is a block diagram of the processing device according to the embodiment, showing its hardware configuration.

As shown in FIG. 21, the navigation device 2A in the processing device 2 includes a CPU 51, a read-only memory (ROM) 52, a random-access memory (RAM) 53, an input-output (I/O) interface 54, a touch screen 55, a telecommunication control unit (TCU) 56, a storage device 57, an SD host module 58, a bus 59, a display 60, and an audio output unit 61. These components include, but are not limited to, one or more semiconductor integrated circuits serving as hardware.

The CPU 51 functions as an arithmetic processor and a control device. The CPU 51 controls the entire operations of the navigation device 2A in accordance with various programs. The CPU 51 executes various programs stored in the ROM 52 using the RAM 53 as a work area. The CPU executes the programs to function as the controller 21 in the processing device 2.

The ROM 52 stores, for example, operation parameters or programs used by the CPU 51. The ROM 52 stores, for example, a program of the module executable by the controller 21. The ROM 52 serves as a part of the storage 24 in the processing device 2.

The RAM 53 temporarily stores a program used by the CPU 51 to perform control. The RAM 53 temporarily stores, for example, variables that change as appropriate when the CPU 51 performs control. The RAM 53 serves as a part of the storage 24 in the processing device 2.

The I/O interface 54 inputs and outputs data between devices connected to the navigation device 2A. The I/O interface 54 receives, for example, information about an input operation performed by the user and data about position information from an input device or a sensor for the navigation device installed in the vehicle. The I/O interface 54 provides, for example, read data to the CPU 51 through the RAM 53 as appropriate.

The touch screen 55 detects an input operation performed by the user. The touch screen 55 serves as the operation unit 25 in the processing device 2. The touch screen 55 may be integral with the display 60.

The TCU 56 communicates with the server 2B and the mobile terminal 2C. The navigation device 2A may communicate with the mobile terminal 2C through near field communications. The TCU 56 serves as the communicator 23 in the processing device 2.

The storage device 57 includes, for example, a magnetic storage device, a semiconductor storage device, an optical storage device, or a magneto-optical storage device. The magnetic storage device is, for example, a hard disk drive (HDD). The storage device 57 stores, for example, a program executable by the CPU 51 and various items of data including data obtained from outside. The storage device 57 serves as a part of the storage 24 in the processing device 2.

The SD host module 58 reads and writes information from and to an inserted SD card serving as a recording medium. The SD host module 58 outputs the information read from the recording medium to, for example, the RAM 53.

The display 60 outputs an image based on the input image data. The display 60 serves as the display 26 in the processing device 2. The display 60 is, for example, a liquid crystal display or an organic EL display.

The audio output unit 61 outputs sound based on the input audio data. The audio output unit 61 serves as the audio output unit 27 in the processing device 2. The audio output unit 61 is a speaker.

The bus 59 connects the components in the navigation device 2A with one another. The bus 59 allows the components in the navigation device 2A to transmit and receive data to and from each other.

The mobile terminal 2C in the processing device 2 has the similar structure to the navigation device 2A but differs from the navigation device 2A in that, for example, the mobile terminal 2C includes a GPS sensor (not shown). The GPS sensor serves as the positioning unit 28 in the processing device 2.

Candidate Selection Process in Modification

Figure 22:
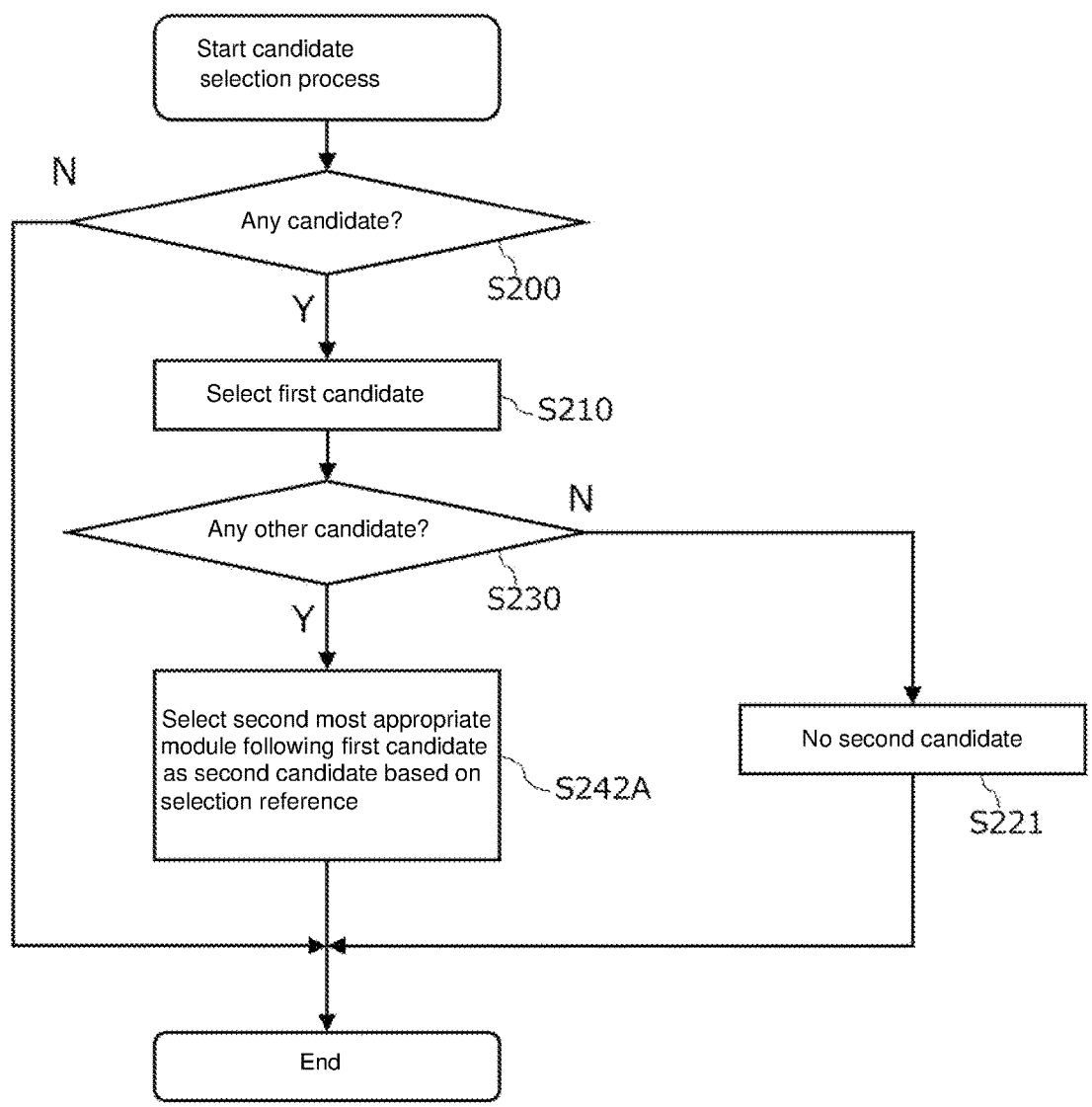
FIG. 22 is a flowchart of a candidate selection process in a modification.

The candidate selection process in the embodiment may be replaced with a candidate selection process in a modification described below with reference to FIG. 22. The candidate selection process in the present modification differs from that in the embodiment in that the first and second candidates are selected independently of whether each candidate is from a current node or another node.

In S200, the function implementer 211 first determines whether the logical network 3 includes any module 4 that can implement an intended predetermined function. When the logical network 3 includes no module 4 that can implement the predetermined function, the function implementer 211 ends the candidate selection process.

When the logical network 3 includes modules 4 that can implement the predetermined function, the function implementer 211 selects the first candidate from the modules 4 based on the predetermined selection reference in S210. The selection reference is described above and will not be described repeatedly.

In S230, the function implementer 211 examines whether the logical network 3 includes any candidate other than the first candidate. When the logical network 3 includes no candidate other than the first candidate, the function implementer 211 ends the candidate selection process without selecting the second candidate in S221.

When the logical network 3 includes one or more candidates other than the first candidate, the function implementer 211 selects the second most appropriate module 4 following the first candidate as the second candidate based on the selection reference in S242A and ends the candidate selection process.

The candidate selection process is not limited to the embodiment and the modification. For example, the function implementer 211 may preferentially select, as the first candidate, the module of the other node or the current node. Specifically, as one selection reference used for selecting the first and second candidates, the reference of selecting the current node or the other node in priority may be used.

Features in Configuring Logical Network 3

As described above, the processing device 2 forms the logical network 3 together with another processing device 2 that implements the same function, of the other processing devices 2 to which the processing device 2 is connectable. Each of the storages 24 in the current processing device 2 and the other processing device 2 stores software including the implementation program 242 executable by the controller 21 and use-data such as the map data 241 used when the implementation program 242 is executed. The current processing device 2 and the other processing device 2 that form the logical network 3 differ from each other in at least a part of the software and the use-data or may differ from each other in the versions of the software and the use-data. In the logical network 3 with the above structure, the result produced by the other processing device 2 implementing the predetermined function differs from the result produced by the current processing device 2 implementing the predetermined function. More specifically, the current processing device 2 forms the logical network 3 together with the other processing device 2 that can produce a different result, instead of the other processing device 2 that produces the same result as the current processing device 2 when implementing the predetermined function. Thus, the processing device 2 forms the logical network 3 while establishing connection simply with the other processing device 2 that produces effective results in implementing the predetermined function and thus can lower the cost for managing the logical network 3.

Examples of the other processing device 2 included in the logical network 3 may include, in addition to a different version of at least one of the software or the use-data, at least one of the software or the use-data generated at different positions in a time-series sequence.

The controller 21 in the processing device 2 may reconfigure the logical network 3 when the version of the software including its implementation program 242 or the version of the use-data is changed. Thus, although the implementation program 242 in the processing device 2 or the version of the use-data is changed, the processing device 2 can reconfigure the network as appropriate together with the other processing device 2 that implements the same function based on at least one of the different version of the implementation program 242 or the different version of the use-data.

In the embodiment, the processing device 2 that has received the node information determines whether the processing device 2 is to start a session, but the determination is not limited to this. For example, the processing device 2 newly connected to the signaling server 2B1 may transmit a signal requesting the node information to the other processing device 2, receive the node information from the other processing device 2, and determine the other processing device 2 that is to start the session.

Other Modifications

The function implementer 211 may select three or more modules as candidates. More specifically, the function implementer 211 may select first to third candidates.

The function implementer 211 may select the first and second candidates from the modules 4 included in the processing device 2 that is online and the modules 4 included in the processing device 2 that is offline.

When using the implementation result of the first or second candidate, the function implementer 211 may neither display the implementation result on the display 26 nor output the implementation result from the audio output unit 27. In this case, at least one of the implementation results of the first and second candidates may be used for processing other than an output. At least one of the implementation results of the first and second candidates may be stored in the storage 24.

The logical network 3 may include a television set as the processing device 2. The processing devices 2 of the same type may be included in the same logical network 3. The television set may be connected to, for example, the Internet or the logical network 3 with a wire.

In the information processing system 1, the server controller 21B serving as the controller 21 in the server 2B may include the function implementer 211.

Each of the processing devices 2 included in the logical network 3 is one electronic device. Instead, two or more electronic devices may serve as one processing device 2 included in the logical network. In this case, the logical network 3 is managed using a group ID. Thus, the information processing system 1 can connect the processing devices 2 in the same group.

In the embodiment, the module 4 is mainly software. Instead, the module 4 may be hardware or may be a combination of software and hardware.

The function implementer 211 may select the module 4 for a candidate based on the response speed instead of the communication speed. More specifically, the time taken to respond to transmission and reception of data between the processing device 2 that transmits a command to implement a predetermined function and the other processing device 2 may be used as the selection reference for the module 4.

The selection reference for the module used by the function implementer 211 may be a combination of multiple indexes instead of one index. For example, the function implementer 211 may perform scoring based on the indexes such as the communication speed, the version for the module 4, and the version of the map, and select the module 4 with a higher score as the first or second candidate.

The present invention is not limited to the above embodiments, but may be modified variously. The technical means described in the modification may be combined as appropriate in other embodiments within the technical scope of the invention.

REFERENCE SIGNS LIST 1 information processing system
2 processing device 21 controller
23 communicator
3 logical network
4 module
211 function implementer

The invention claimed is:

1. An information processing system, comprising:
two or more processing devices included in a network, each of the two or more processing devices including
a controller including modules to implement a predetermined function based on software, and
a communicator configured to perform communications based on control performed by the controller,
wherein the controller included in at least one of the two or more processing devices selects one of the modules as a first candidate, and another one of the modules as a second candidate configured to implement the same function as the first candidate and having a lower order than the first candidate based on a predetermined reference,
transmits a command to implement the function to each of the first candidate and the second candidate, and
receives a first implementation result produced by the first candidate executing the command, and a second implementation result produced by the second candidate executing the command.

2. The information processing system according to claim 1, wherein
the controller included in at least one of the two or more processing devices includes a function implementer configured to select the first candidate and the second candidate, transmit the command to each of the first candidate and the second candidate, and receive the first implementation result and the second implementation result, and
the function implementer causes an output unit configured to output at least one of image data or audio data to output information based on the second implementation result when the function implementer receives no first implementation result after a predetermined time elapses following transmission of the command to each of the first candidate and the second candidate.

3. The information processing system according to claim 2, wherein
the predetermined reference is one of a communication speed being a data volume transmittable and receivable per unit time between a first processing device including the function implementer and a second processing device different from the first processing device, a version of the software corresponding to the command, or a version of map data used when navigation is implemented as the function.

4. The information processing system according to claim 3, wherein
the function implementer selects, as the first candidate or the second candidate, one of the modules included in the first processing device when the first processing device is to implement the function in accordance with the command.

5. The information processing system according to claim 4, wherein
the function implementer reselects the first candidate and the second candidate based on a predetermined reference when the function implementer receives no first implementation result and no second implementation result after the predetermined time elapses.

6. The information processing system according to claim 4, wherein
the function implementer selects the first candidate and the second candidate from the modules included in at least one of the two or more processing devices being online.

7. A processing device, comprising:
a controller including modules to implement a predetermined function based on software; and
a communicator configured to perform communications based on control performed by the controller,
wherein the processing device is included in a network together with another processing device, and
the controller selects one of the modules as a first candidate, and another one of the modules as a second candidate configured to implement the same function as the first candidate and having a lower order than the first candidate based on a predetermined reference,
transmits a command to implement the function to each of the first candidate and the second candidate, and
receives a first implementation result produced by the first candidate executing the command, and a second implementation result produced by the second candidate executing the command.

8. A processing method implementable with an information processing system including two or more processing devices included in a network, each of the two or more processing devices including a controller including modules to implement a predetermined function based on software, and a communicator configured to perform communications based on control performed by the controller, the method comprising:
selecting, with the controller included in at least one of the two or more processing devices, one of the modules as a first candidate, and another one of the modules as a second candidate configured to implement the same function as the first candidate and having a lower order than the first candidate based on a predetermined reference;
transmitting, with the controller included in the at least one of the two or more processing devices, a command to implement the function to each of the first candidate and the second candidate; and
receiving, with the controller included in the at least one of the two or more processing devices, a first implementation result produced by the first candidate executing the command, and a second implementation result produced by the second candidate executing the command.

9. The information processing system according to claim 5, wherein
the function implementer selects the first candidate and the second candidate from the modules included in at least one of the two or more processing devices being online.

* * * * *